(12) United States Patent
Dever et al.

(10) Patent No.: US 12,212,808 B2
(45) Date of Patent: *Jan. 28, 2025

(54) SYSTEMS AND METHODS FOR SELECTING NETWORK- CONNECTED DEVICES TO PROVIDE DEVICE FUNCTIONS FOR AN EVENT

(71) Applicant: Adeia Guides Inc., San Jose, CA (US)

(72) Inventors: Sara Dever, Boothwyn, PA (US); Jennifer L Holloway, Wallingford, PA (US); Daniel P. Rowan, Springfield, PA (US); Mark D. Thompson, Havertown, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,121

(22) Filed: Apr. 11, 2023

(65) Prior Publication Data

US 2023/0262284 A1    Aug. 17, 2023

Related U.S. Application Data

(63) Continuation of application No. 17/041,004, filed as application No. PCT/US2018/024652 on Mar. 27, 2018, now Pat. No. 11,653,055.

(51) Int. Cl.
*H04N 21/436* (2011.01)
*G16Y 10/60* (2020.01)
(Continued)

(52) U.S. Cl.
CPC ... *H04N 21/43615* (2013.01); *H04N 21/4131* (2013.01); *H04N 21/42203* (2013.01);
(Continued)

(58) Field of Classification Search
None
See application file for complete search history.

(56) References Cited

U.S. PATENT DOCUMENTS 6,239,794 B1    5/2001    Yuen et al.
6,564,378 B1    5/2003    Satterfield et al.
(Continued)

FOREIGN PATENT DOCUMENTS

WO    2018005334 A1    1/2018

OTHER PUBLICATIONS

International Search Report and Written Opinion of PCT/2018/024652 dated Jul. 13, 2018.

(Continued)

*Primary Examiner* — James R Marandi
(74) *Attorney, Agent, or Firm* — Haley Guiliano LLP

(57) ABSTRACT

Systems and methods are provided for selecting one or more network-connected devices to provide device functions required by an event. A media guidance application may detect an event in which a user is currently engaged. The media guidance application may identify a set of device capabilities associated with the event. The media guidance application may search, within a plurality of network-connected devices of the user, to identify one or more devices that enable functions corresponding to the set of device capabilities to be perceptible to the user, and the media guidance application may instruct the identified one or more devices to provide the functions corresponding to the set of device capabilities associated with the event.

20 Claims, 11 Drawing Sheets

(51) Int. Cl.
  *G16Y 20/40*  (2020.01)
  *H04N 21/41*  (2011.01)
  *H04N 21/422* (2011.01)
  *H04N 21/432* (2011.01)
  *H04N 21/435* (2011.01)
  *H04N 21/442* (2011.01)

(52) U.S. Cl.
  CPC ....... *H04N 21/4325* (2013.01); *H04N 21/435* (2013.01); *H04N 21/44218* (2013.01); *G16Y 10/60* (2020.01); *G16Y 20/40* (2020.01)

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 8,731,373 B2 | 5/2014 | Gerbasi |
| 11,653,055 B2 | 5/2023 | Dever et al. |
| 2002/0174430 A1 | 11/2002 | Ellis et al. |
| 2005/0251827 A1 | 11/2005 | Ellis et al. |
| 2009/0070798 A1 | 3/2009 | Lee et al. |
| 2010/0153885 A1 | 6/2010 | Yates |
| 2015/0134761 A1 | 5/2015 | Sharma et al. |
| 2016/0055879 A1 | 2/2016 | Arai et al. |
| 2017/0048476 A1 | 2/2017 | Freiin Von Kapri et al. |
| 2017/0155703 A1 | 6/2017 | Hao et al. |
| 2017/0310608 A1 | 10/2017 | Kulick |
| 2017/0330565 A1* | 11/2017 | Daley ................ G10L 17/00 |
| 2020/0059976 A1 | 2/2020 | Bhatia et al. |
| 2021/0105529 A1 | 4/2021 | Dever et al. |
| 2021/0182111 A1 | 6/2021 | Jakobsson |

OTHER PUBLICATIONS

"IPRP", International Preliminary Report on Patentability of PCT/US2018/024652 dated Sep. 29, 2020 (12 pages).

Anonymous , "Anonymous: "Alexa can tell you the steps for CPR, warning signs of heart attack and stroke—News on Heart.org, Feb. 22, 2017 (Feb. 22, 2017), XP055488203, Retrieved from the Internet: (3 pages), 3 pages.

Isbitski, David , David Isbitski, "Alexa blog—How to Control Your Content with the Video Skill API", Jun. 8, 2017 (13 pages), 13 pages.

Palermo, Michael , Michael Palermo, "Managing Device Discovery for Your Alexa Smart Home Skill", Sep. 27, 2016 (Sep. 27, 2016)(22 pages), 22 pages.

* cited by examiner

SYSTEMS AND METHODS FOR SELECTING NETWORK- CONNECTED DEVICES TO PROVIDE DEVICE FUNCTIONS FOR AN EVENT

CROSS-REFERENCE TO RELATED APPLICATIONS

This application is a continuation of U.S. application Ser. No. 17/041,004, filed Sep. 24, 2020, which is a national stage application under 35 U.S.C. § 371 of International Application PCT/US2018/024652, filed Mar. 27, 2018, the disclosures of which are hereby incorporated by reference herein in their entireties.

BACKGROUND

The Internet has grown tremendously in the last few years. Historically, only computers and similar devices have been able to connect to the Internet. However, recently other household objects have been built with sensors and the ability to connect to the Internet and other networks. These devices have collectively been called The Internet of Things ("IoT"). IoT devices may include lights, recliners, cameras, microphones, and other such devices. A problem arose as to how to control groups of these devices in order to achieve a specific affect. For example, prepare a room for a specific purpose (e.g., watching television). Current systems enable a user (e.g., via a remote control) to press a button on the remote control and not only turn on the correct devices to watch television (e.g., television and set-top box), but also dim the lights to a preprogrammed level so that the user is comfortable while watching television. However, current systems do not control IoT devices in specific situations without having to be specifically instructed by a user.

SUMMARY

Accordingly, systems and methods are provided here selecting one or more network-connected devices to provide device functions required by an event. For example, a media guidance application may detect an event in which a user is currently engaged. The media guidance application may identify a set of device capabilities associated with the event. The media guidance application may search, within a plurality of network-connected devices of the user, to identify one or more devices that enable functions corresponding to the set of device capabilities to be perceptible to the user, and the media guidance application may instruct the identified one or more devices to provide the functions corresponding to the set of device capabilities associated with the event.

To this end and others, in some aspects of the disclosure, a media guidance application may detect an incident that the user is currently involved with. Specifically, a media guidance application may detect an event in which a user is currently engaged. For example, the media guidance application may detect an utterance from a user (e.g., the user saying, "This man is choking") and determine based on the content of the utterance (e.g., using the keyword "choking") that the user is currently engaged in an event (e.g., an emergency).

In some embodiments, the media guidance application may, when detecting the incident that the user is currently involved with, detect the user speaking. Specifically, the media guidance application may, when detecting the event in which the user is currently engaged, detect an utterance associated with the user. For example, the media guidance application may detect, via a network-connected device that contains a microphone, that the user is speaking.

The media guidance application may determine the incident that the user is involved with based on the words and phrases that the user spoke. Specifically, the media guidance application may determine, based on content of the utterance, that the user is currently engaged in the event. For example, the media guidance application may determine, based on the content of the utterance (e.g., "Help, someone is choking!"), that the user is currently engaged in the event (e.g., an emergency).

In some embodiments, the media guidance application may determine the category of situation that the user is currently involved with (e.g., emergency, cleaning, cooking, etc.). Specifically, the media guidance application may determine a type associated with the event. For example, the media guidance application may determine (e.g., using a lookup table) that the type associated with the event (e.g., based on keyword choking) is "medical emergency".

In some embodiments, the media guidance application, when determining the category of the incident that the user is currently involved with, may transmit, to a database, one or more keywords that describe the incident. Specifically, the media guidance application may, when determining the type associated with the event, transmit, to a database that stores event types and corresponding event identifiers, an identifier associated with the event. For example, the media guidance application may transmit, to a database that stores event types and corresponding event identifiers, an identifier (e.g., the identifier "choking") associated with the event (e.g., medical emergency related to choking).

The media guidance application may receive, from the database, the type associated with the incident the user is involved with. Specifically, the media guidance application may receive, from the database server, the type associated with the event. For example, the media guidance application may receive the type (e.g., emergency medical services with keyword choking) from the database server.

In some embodiments, the media guidance application may retrieve, based on the category of the incident that the user is currently involved with, potential device responses that aid the user with their current situation. Specifically, the media guidance application may retrieve, based on the type associated with the event, one or more device functions associated with the event. For example, the media guidance application may retrieve, based on the type (e.g., emergency medical services related to choking), one or more device functions (e.g., play a CPR video, play audio instructions for how to perform the Heimlich maneuver, etc.) associated with the event.

In some embodiments, the media guidance application may, when retrieving, based on the category of the incident that the user is currently involved with, potential device responses that aid the user with their current situation, send a request for the potential device responses that includes a word that describes the incident. Specifically, the media guidance application may, when retrieving, based on the type associated with the event, one or more device functions associated with the event, transmit, to a database that stores types associated with events and corresponding functions, a request for the one or more device functions associated with the event, where the request includes an identifier of the event. For example, the media guidance application may transmit, to the database, a request for one or more device functions associated with a medical emergency for choking that includes an identifier (e.g., the word "choking") of the event.

The media guidance application may receive the potential device responses that aid the user with their current situation. Specifically, the media guidance application may receive the one or more device functions. For example, the media guidance application may receive the one or more device functions (e.g., play a CPR video, play audio instructions for how to perform the Heimlich maneuver, calling an emergency number, or another suitable function.)

In some embodiments, the media guidance application may retrieve device capabilities for the devices in the user's environment. Specifically, the media guidance application may retrieve a plurality of device capabilities associated with a plurality of network-connected devices of the user. For example, the media guidance application may retrieve a plurality of device capabilities (e.g., audio, video, ability to alert the authorities, ability to manipulate light, etc.) associated with a plurality of network-connected devices of the user (e.g., the user's television, the user's Bluetooth speakers, the user's home security system, etc.).

In some embodiments, the media guidance application may select a set of devices that have the capability to perform the potential device responses that aid the user with their current situation. Specifically, the media guidance application may select, from the plurality of network-connected devices of the user, a first set of devices that includes devices that are associated with one or more device capabilities corresponding to the one or more device functions associated with the event. For example, the media guidance application may select a set of devices from the plurality of network-connected devices (e.g., speaker, television, Amazon Echo, Ring doorbell, Nest thermostat, mobile phone, etc.) that includes devices (e.g., television, speakers) with one or more device capabilities (e.g., ability to play video and audio) corresponding to the one or more device functions (e.g., play a CPR video, play audio instructions for how to perform the Heimlich maneuver, etc.) associated with the keyword choking.

In some embodiments, the media guidance application may, when selecting the set of devices that have the capability to perform the potential device responses that aid the user with their current situation, compare metadata for the potential device responses to metadata for the capabilities of each device. Specifically, the media guidance application may, when selecting, from the plurality of network-connected devices of the user, the first set of devices that includes devices that are associated with one or more device capabilities corresponding to the one or more device functions associated with the event, compare metadata associated with each function of the one or more device functions with metadata associated with each of the one or more device capabilities. For example, the media guidance application may compare metadata associated with each required function (e.g., audio output, video output, or another suitable function) with metadata associated with each of the one or more device capabilities (e.g., audio metadata, video metadata, etc.).

The media guidance application may generate a set of devices where the set contains devices where the information about the device capabilities for each device matches the information about the potential device responses. Specifically, the media guidance application may generate, based on the comparing, the first set of devices, where the first set of devices includes those devices in the plurality of network-connected devices with respective metadata matching corresponding metadata associated with each of the one or more device capabilities. For example, the media guidance application may generate, based on the comparing, the first set of devices (e.g., television and speakers), where the first set of devices includes those devices in the plurality of network-connected devices with respective metadata (e.g., the device functions require audio and video output) matching corresponding metadata associated with each of one or more device capabilities (e.g., supports audio output and/or video output).

In some embodiments, the media guidance application may receive, for each device in the set of devices, data indicating whether the devices in the set are able to actively interact with the user (e.g., be seen and heard by the user). Specifically, the media guidance application may receive, for each device in the first set of devices, data indicating whether each device in the first set of devices is perceptible to the user. For example, the media guidance application may receive location data for the user and for each device in the first set of devices to determine whether the user is close enough to each device for the device to be perceptible to the user.

In some embodiments, the media guidance application may, when receiving for each device in the set of devices, the data indicating whether the devices in the set are able to actively interact with the user, determine how each device takes inputs. Specifically, the media guidance application may, when receiving for each device in the first set of devices, the data indicating whether each device in the first set of devices is perceptible to the user, determine an input capability of each device in the first set of devices. For example, the media guidance application may determine an input capability of each device (e.g., audio input, input via instructions from a network, video input, or another suitable capability).

The media guidance application may send a command to each device to collect input. Specifically, the media guidance application may instruct each device of the first set of devices, based on a respective input capability, to collect input. For example, the media guidance application may instruct each device (e.g., built in microphone to the TV, security camera, etc.) to collect input (e.g., sounds from the surrounding environment, video from the surrounding environment, or another suitable input).

The media guidance application may determine from the collected input whether the device can detect and interact with the user (i.e., is perceptible to the user). Specifically, the media guidance application may determine, from the collected input, whether each device in the first set of devices is able to detect the user. For example, the media guidance application may determine from the collected input (e.g., a frame of the position of the user with relation to the device) whether each device in the first set of devices is able to detect the user (e.g., whether the user is facing the device). As another example, the media guidance application may determine from the collected input (e.g., a detected utterance from the user) whether each device in the first set of devices is able to detect the user (e.g., whether each device is able to detect an utterance), and based on a determined location of the utterance (e.g., by triangulating the audio signals at different devices), determining whether the user is within range of an audio output from the device). As yet another example, the media guidance application may determine from the collected input (e.g., a location of the user), whether each device in the first set of devices is able to detect the user (e.g., the user is within a certain radius of a network-connected device so that the device is enabled to alert (e.g., call) emergency services).

In some embodiments, the media guidance application may send a command to a device to request the device's capabilities. Specifically, the media guidance application may, when determining the input capability of each device in the first set of devices, transmit, using an Application Programming Interface ("API"), to a device of the first set of devices a request for device capabilities. For example, the media guidance application may transmit, using an API, to a device (e.g., a television) of the first set of devices a request for device capabilities (e.g., audio, video, etc.).

The media guidance application may receive, from the first device, a response that includes the device capabilities. Specifically, the media guidance application may receive, from the first device using the API, a response that includes the device capabilities. For example, the media guidance application may receive, from the first device (e.g., a television) using the API, a response that includes the device capabilities (e.g., audio and video output).

In some embodiments, the media guidance application may, when receiving for each device in the set of devices, whether the device can detect and interact with the user, monitor inputs for each of the devices. Specifically, the media guidance application may, when receiving for each device in the first set of devices, the data indicating whether each device in the first set of devices is perceptible to the user, monitor input for each of the plurality of devices of the user. For example, the media guidance application may monitor input for each of the plurality of devices of the user (e.g., television, speaker, etc.).

The media guidance application may detect, based on the monitored input, whether the device can detect the user. Specifically, the media guidance application may detect, based on monitored input, that the user is detectable by a first device of the plurality of devices. For example, the media guidance application may detect, based on monitored input (e.g., a frame showing the user facing the television), that the user is detectable by a first device (e.g., the television) of the plurality of devices.

The media guidance application may notify the user, during the incident that the user is currently dealing with, that the device is available to the user. Specifically, the media guidance application may notify the user, during the event, that the device is available to the user. For example, the media guidance application may notify the user (e.g., via an audible alert, a visual alert, or another suitable alert) that the device (e.g., the television) is available to the user during the event.

In some embodiments, the media guidance application may list a second set of devices that includes devices that can detect and interact with the user. Specifically, the media guidance application may generate, based on the data indicating whether each device in the first set of devices is perceptible to the user, a second set of devices that includes devices of the first set that are perceptible to the user. For example, the media guidance application may generate, based on the data indicating whether each device in the first set of devices is perceptible to the user, a second set of devices (e.g., the television, the speakers, the alarm system) that includes devices of the first set (e.g., the television, the speakers).

In some embodiments, the media guidance application may send a command to each device in the second set of devices to provide the potential device responses that aid the user with their current situation. Specifically, the media guidance application may instruct each device in the second set of devices to provide the functions associated with the event. For example, the media guidance application may instruct each device in the second set of devices (e.g., the television, the speakers, the alarm system) to provide functions (e.g., play a cardiopulmonary resuscitation ("CPR") video, play audio instructions for how to perform the Heimlich maneuver, alerting emergency services, or perform another suitable function) associated with the event (e.g., a medical emergency).

In some embodiments, the media guidance application may, when sending a command to each device in the second set of devices to provide the potential device responses that aid the user with their current situation, determine that a video clip is available that is related to the user's current situation. Specifically, the media guidance application may, when instructing each device in the second set of devices to provide the functions associated with the event, determine that a media asset is available that is related to the event. For example, the media guidance application may determine that a media asset is available (e.g., a video of how to administer the Heimlich maneuver) that is related to the event (e.g., medical emergency involving choking).

The media guidance application may determine, based on information about a piece of media, that a device in the second set of devices can play the piece of media. Specifically, the media guidance application may determine, based on a type of media asset, a device of the second set of devices that is able to play the media asset. For example, the media guidance application may determine, based on a type of media asset (e.g., video, audio, or another suitable type), a device (e.g., a television) of the second set of devices that is able to play the media asset (e.g., a video on how to perform the Heimlich maneuver).

The media guidance application may play the media clip using the device that is able to play the media clip. Specifically, the media guidance application may play the media asset using the device of the second set of devices that is able to play the media asset. For example, the media guidance application may play the media asset (e.g., a video on how to perform the Heimlich maneuver) using the device (e.g., the television) of the second set of devices that is able to play the media asset. As another example, the media guidance application may play the media asset (e.g., a hologram on how to perform the Heimlich maneuver) using the device (e.g., a smartphone that may project holograms (e.g., on a wall)) of the second set of devices that is able to play the media asset.

In some embodiments, the media guidance application may, when sending a command to each device in the second set of devices to provide the potential device responses that aid the user with their current situation, determine a potential device response that the user wants based on detecting what the user says. Specifically, the media guidance application may, when instructing each device in the second set of devices to provide the functions associated with the event, determine a function that the user desires based on a user's utterance. For example, the media guidance application may determine a function that the user desires (e.g., a video of how to perform the Heimlich maneuver) based on the user's utterance (e.g., the user saying that someone is choking).

The media guidance application may determine whether the device response that the user desires can be provided using one of the devices in the second set of devices. Specifically, the media guidance application may determine whether the function that the user desires can be provided using a device of the second set of devices. For example, the media guidance application may determine whether the function required (e.g., a video of how to perform the Heimlich maneuver) can be provided using a device (e.g., Bluetooth speakers) of the second set of devices.

In response to determining that the device response that the user desires cannot be provided on any device in the second set of devices, the media guidance application may choose a device outside of the devices in the second set to provide the desired device response. Specifically, in response to determining that the function that the user desires cannot be provided using any device of the second set of devices, the media guidance application may use a device from the first set of devices that is not in the second set of devices to provide the function. For example, in response to determining that the function that the user desires (e.g., a video clip that is available for the event) cannot be provided using any device of the second set of devices (e.g., Bluetooth speakers, alarm system) the media guidance application may use a device from the first set of devices (e.g., a computer, a television, Bluetooth speakers, etc.) that is not in the second set of devices to provide the function (e.g., a television).

BRIEF DESCRIPTION OF THE FIGURES

The below and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for selecting one or more network-connected devices to provide device functions required by an event. For example, a media guidance application may detect an event in which a us is currently engaged. The media guidance application may identify a set of device capabilities associated with the event. The media guidance application may search, within a plurality of network-connected devices of the user, to identify one or more devices that enable functions corresponding to the set of device capabilities to be perceptible to the user. The media guidance application may instruct the identified one or more devices to provide the functions corresponding to the set of device capabilities associated with the event.

Figure 1:
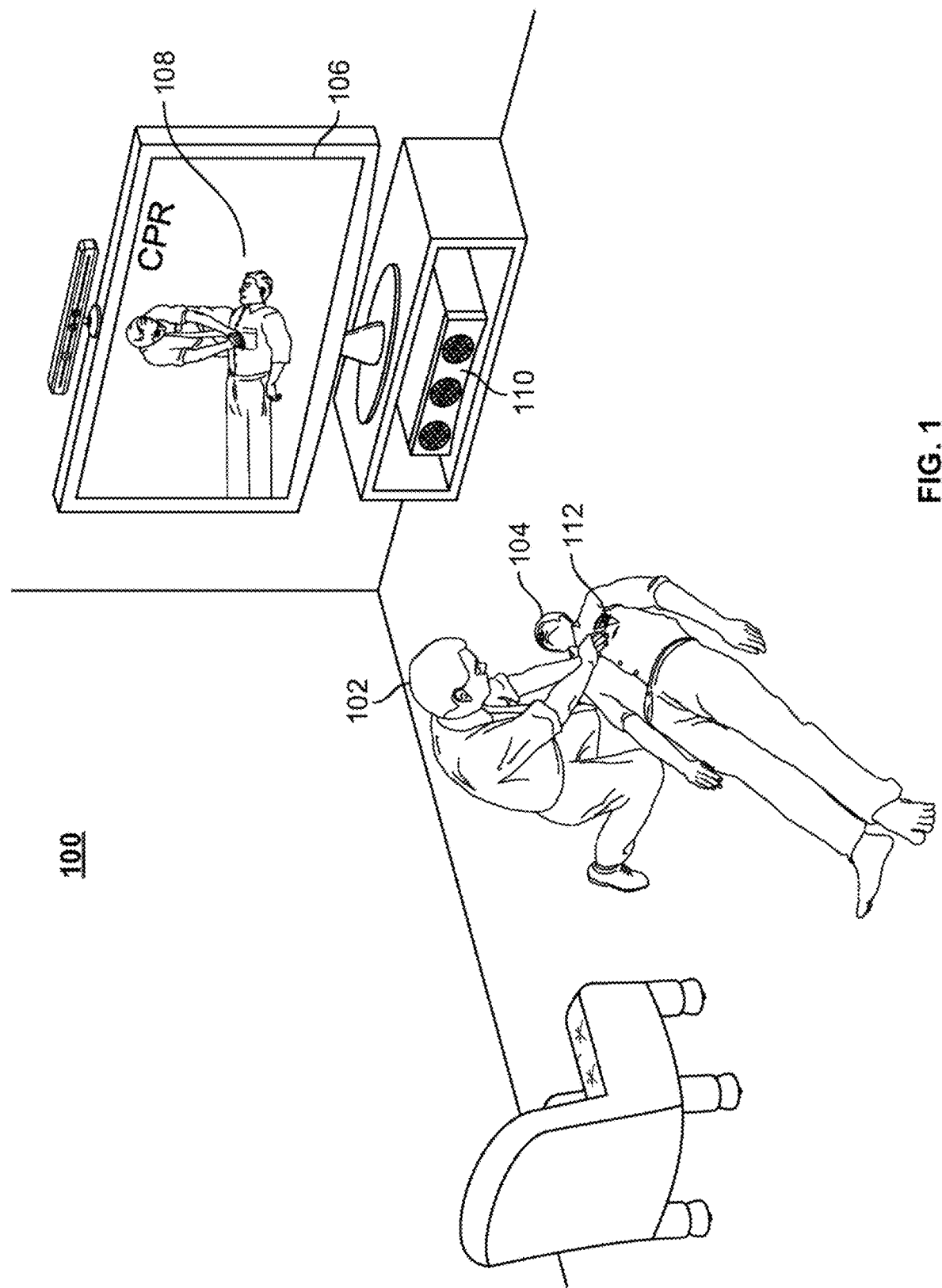
FIG. 1 is an illustrative example for selecting one or more network-connected devices to provide device functions required by an event in accordance with some embodiments of the disclosure.

FIG. 1 shows an illustrative embodiment of selecting one or more network-connected devices to provide device functions required by an event in accordance with some embodiments of the disclosure. FIG. 1 depicts user equipment 106, which may include control circuitry that executes a media guidance application on any user equipment. The functionality of user equipment, control circuitry, and the media guidance application is described in further detail below with respect to FIGS. 2-5.

The media guidance application may detect event 112 (e.g., user 102 performing CPR on user 104). The media guidance application may determine that event 112 takes place in environment 100. For example, the media guidance application may determine that event 112 (e.g., user 102 performing cardiopulmonary resuscitation ("CPR") on an individual 104) takes place in environment 100 (e.g., user 102's living room). The media guidance application may determine that user 102 is involved with event 112, of which user 104 is also a participant in. The media guidance application may provide device functions required by event 112 (e.g., user 102 administering CPR on individual 104) from user equipment 106 (e.g., which may be a television) and speakers 110. The media guidance application may select user equipment 106 to provide device functions required by the event (e.g., play back media asset 108 on user equipment 106). For example, the media guidance application may select user equipment 106 (e.g., which may be a television) to provide device functions required by the event (e.g., play back a video clip of how to perform CPR).

In some embodiments, the media guidance application may determine that event 112 takes place in environment 100. For example, environment 100 may be a user's house, vehicle, public area (e.g., neighborhood), or any similar place or area.

Accordingly, systems and methods are provided herein for selecting one or more network-connected devices to provide device functions required by an event. For example, a media guidance application may detect an event in which a user is currently engaged. The media guidance application may identify a set of device capabilities associated with the event. The media guidance application may search, within a plurality of network-connected devices of the user, to identify one or more devices that enable functions corresponding to the set of device capabilities to be perceptible to the user, and the media guidance application may instruct the identified one or more devices to provide the functions corresponding to the set of device capabilities associated with the event.

To this end and others, in some embodiments, a media guidance application may detect an incident that the user is currently involved with. Specifically, a media guidance application may detect an event in which a user is currently engaged. For example, the media guidance application may detect an utterance from a user (e.g., the user saying, "Someone is choking") and determine, based on the content of the utterance (e.g., using the keyword "choking"), that the user is currently engaged in an event (e.g., a medical emergency related to choking).

In some embodiments, the media guidance application, when detecting the incident that the user is currently involved with, may detect the user speaking. Specifically, the media guidance application, when detecting the event in which the user is currently engaged, may detect an utterance associated with the user. For example, the media guidance application may determine, based on the content of the utterance (e.g., "Help, someone choking!"), that the user is currently engaged in the event (e.g., a medical emergency related to choking). As another example, the media guidance application may detect, via a network-connected device that contains a microphone, that the user is speaking. The media guidance application may detect any audible input (e.g., any sound) in environment 100 using user equipment 106 (e.g., a microphone).

The media guidance application may parse the audible output with a speech database to determine text that corresponds to the audible input. The media guidance application may compare characteristics of the audible input to a profile from the user to determine whether the user produced the audible output (e.g., determine whether the user produced the sound or something or someone else produced the sound).

The media guidance application may determine the incident that the user is involved with based on the words and phrases that the user spoke. Specifically, the media guidance application may determine, based on content of the utterance, that the user is currently engaged in the event. For example, the media guidance application may determine, based on the content of the utterance (e.g., "Help, someone is choking!"), that the user is currently engaged in the event (e.g., choking). The media guidance application may determine keywords from the textual representation of the utterance (e.g., "help", "choking"). The media guidance application may compare each keyword with entries in a database, where keywords are linked to events in the database. An event may be any suitable incident. In some embodiments, for example, an event may be an emergency situation (e.g., a user choking, a user having a heart attack, a user sustaining an injury, etc.). In some embodiments, for example, an event may be a cultural celebration (e.g., a Christmas dinner, a Quinceañera, a Superbowl party, sports match, etc.). In some embodiments, for example, an event may be a household task (e.g., washing dishes, doing the laundry, cooking, etc.). In some embodiments, for example, an event may be a user task (e.g., walking the dog, driving to work, repairing household appliances, etc.). The media guidance application may determine that the user is currently engaged in the event if a determined keyword is matched to an event in the database.

In some embodiments, the media guidance application may determine the category of situation that the user is currently involved with (e.g., emergency, cleaning, cooking, etc.). Specifically, the media guidance application may determine a type associated with the event. As referred to herein, a "type" may refer to a category that describes the event. For example, a type may include, cooking, emergency, cleaning, sports, exercise, etc. For example, the media guidance application may determine (e.g., using a lookup table) that the type associated with the event (e.g., based on the keyword choking) is "medical emergency". The media guidance application may retrieve the type associated with the event from an entry in a database.

In some embodiments, the media guidance application may, when determining the category of the incident that the user is currently involved with, transmit a word that describes the incident to a database. Specifically, the media guidance application may, when determining the type associated with the event, transmit, to a database that stores event types and corresponding event identifiers, an identifier associated with the event. As referred to herein, an identifier may be any corresponding data that describes the event. For example, an identifier may be a keyword, event metadata, or any similar data. For example, the media guidance application may transmit, to a database that stores event types and corresponding event identifiers, an identifier (e.g., the identifier "choking") associated with the event (e.g., a user choking).

The media guidance application may receive, from the database, the type associated with the incident the user is involved with. Specifically, the media guidance application may receive, from the database server, the type associated with the event. For example, the media guidance application may receive the type (e.g., medical emergency related to choking) from the database server. The media guidance application may receive, from the database, the type associated with the event, where the type is linked to the event in the database by the identifier.

In some embodiments, the media guidance application may retrieve, based on the category of the incident that the user is currently involved with, potential device responses that aid the user with their current situation. Specifically, the media guidance application may retrieve, based on the type associated with the event, one or more device functions associated with the event. A function may be any suitable output from a device. In some embodiments, for example, it may be a media asset (e.g., a video clip) to be played back on a device that supports playing back media assets. In some embodiments, for example, it may be an audio output (e.g., a song, audible directions, etc.) that may be played back on any device capable of outputting audio. In some embodiments, for example, it may be an alert (e.g., calling emergency services), where any device that is capable of sending an alert (e.g., a network-connected device that can send an alert over the network) may be used. In some embodiments, for example, it may be a hologram, where any device that is capable of projecting the hologram may be used. In some embodiments, the function may be modifying the output of an IoT device (e.g., network-connected switches, lightbulbs, thermostats, appliances, or any other network-enabled device) to respond to the event (e.g., brighten/dim the light from the light bulbs, change the temperature of the thermostat, turn on/off appliances, etc.). For example, the media guidance application may retrieve, based on the type (e.g., emergency medical services with keyword choking), one or more device functions (e.g., play a CPR video, play audio instructions for how to perform the Heimlich maneuver, etc.) associated with the event. The media guidance application may retrieve, from an entry in a database that links one or more device functions with an event, device functions associated with the event. The media guidance application may determine that the database that links the device functions with an event may be user defined (e.g., a user tags a corresponding event to a device function via user input), or may be editor defined (e.g., manually or using matching metadata of the event and the function), or a combination of the above.

In some embodiments, the media guidance application may, when retrieving, based on the category of the incident that the user is currently involved with, potential device responses that aid the user with their current situation, send a request for the potential device responses that includes a word that describes the incident. Specifically, the media guidance application may, when retrieving, based on the type associated with the event, one or more device functions associated with the event, transmit, to a database that stores types associated with events and corresponding functions, a request for the one or more device functions associated with the event, where the request includes an identifier of the event. For example, the media guidance application may transmit, to the database, a request for one or more device functions associated with a medical emergency for choking that includes an identifier (e.g., the word "choking") of the event. The media guidance application may transmit to a database that links identifiers to types, where types are then linked with events and corresponding functions, a request for the one or more device functions associated with the event, where the request includes an identifier of the event. In some embodiments, the media guidance application may transmit requests to two separate databases, the first database that links types to identifiers, and the second database that links types to events and functions. For example, the media guidance application may first transmit a request to the first database to retrieve a type linked to the identifier. Then, the media guidance application may transmit a request to the second database to retrieve a function of the event based on the retrieved type.

The media guidance application may receive the potential device responses that aid the user with their current situation. Specifically, the media guidance application may receive the one or more device functions. For example, the media guidance application may receive the one or more device functions (e.g., play a CPR video, play audio instructions for how to perform the Heimlich maneuver, calling an emergency number, or another suitable function). The media guidance application may receive the one or more device functions from a database as described above.

In some embodiments, the media guidance application may retrieve device capabilities for the devices in the user's environment. Specifically, the media guidance application may retrieve a plurality of device capabilities associated with a plurality of network-connected devices of the user. For example, the media guidance application may retrieve a plurality of device capabilities (e.g., audio, video, ability to alert the authorities, ability to manipulate light, etc.) associated with a plurality of network-connected devices of the user (e.g., the user's television, the user's Bluetooth speakers, the user's home security system, etc.).

The media guidance application may access a datastore of devices that have connected to the network associated with environment 100. For example, the media guidance application may monitor a device access control address table, an address resolution protocol table, a dynamic host configuration protocol assignment table, and a table of recent network communications, or any combination of the above to determine the network-connected devices. The media guidance application may determine device capabilities from metadata associated with each device. For example, the media guidance application may retrieve metadata associated with each device from device profiles. The media guidance application may retrieve the device profiles from a database, where the device profiles are created by an editor (e.g., the device manufacturer).

In some embodiments, the media guidance application may select a set of devices that have the capability to perform the potential device responses that aid the user with their current situation. Specifically, the media guidance application may select, from the plurality of network-connected devices of the user, a first set of devices that includes devices that are associated with one or more device capabilities corresponding to the one or more device functions associated with the event.

For example, the media guidance application may select a set of devices from the plurality of network-connected devices (e.g., speaker, television, Amazon Echo, Ring doorbell, Nest thermostat, a hologram device, etc.) that includes devices (e.g., television, speakers) with one or more device capabilities (e.g., ability to play video and audio) corresponding to the one or more device functions (e.g., play a CPR video, play audio instructions for how to perform the Heimlich maneuver, etc.) associated with the keyword choking. The media guidance application may select the devices based on their metadata as described in detail below.

In some embodiments, the media guidance application may, when selecting the set of devices that have the capability to perform the potential device responses that aid the user with their current situation, compare metadata for the potential device responses to metadata for the capabilities of each device. Specifically, the media guidance application may, when selecting, from the plurality of network-connected devices of the user, the first set of devices that includes devices that are associated with one or more device capabilities corresponding to the one or more device functions associated with the event, compare metadata associated with each function of the one or more device functions with metadata associated with each of the one or more device capabilities.

For example, the media guidance application may compare metadata associated with each required function (e.g., audio output, video output, or another suitable function) with metadata associated with each of the one or more device capabilities (e.g., audio metadata, video metadata, etc.). The media guidance application may compare the metadata associated with each function (e.g., file format (MP3, FLAC, MPC, WAV, MP4, ASF, AVI, FLV, MOV, etc.), quality (e.g., standard definition, high definition, 4K, etc), network connectivity, etc.) with each of the one or more device capabilities (e.g., can play video and audio files, can access the network, etc.).

The media guidance application may generate a set of devices where the set contains devices where the information about the device capabilities matches the information about the potential device responses. Specifically, the media guidance application may generate, based on the comparing, the first set of devices, where the first set of devices includes those devices in the plurality of network-connected devices with respective metadata matching corresponding metadata associated with each of the one or more device capabilities. For example, the media guidance application may generate, based on the comparing, the first set of devices (e.g., television and speakers), where the first set of devices includes those devices in the plurality of network-connected devices with respective metadata (e.g., the device functions require audio and video output) matching corresponding meta data associated with each of one or more device capabilities (e.g., supports audio output and/or video output).

In some embodiments, the media guidance application may receive for each device in the set of devices, data indicating whether the devices in the set are able to actively interact with the user (e.g., be seen and heard by the user). Specifically, the media guidance application may receive for each device in the first set of devices, data indicating whether each device in the first set of devices is perceptible to the user. For example, the media guidance application may receive location data for the user and for each device in the first set of devices to determine whether the user is close enough to each device for the device to be perceptible to the user. The media guidance application may request data (e.g., input data from the devices) from the devices.

The media guidance application may determine that the data contains the location of the user (e.g., an image of the user, audio data that determines the position of the user). The media guidance application may determine, from the data, the location of the user in regard to each device, as well as a perceptibility value. The media guidance application may determine the perceptibility value as a function of the location of the user and the user's body language in reference to the device (e.g., whether the user is facing the device, is within hearing range of the device, does not have and audio and visual barriers, etc.). Detecting whether a device is perceptible to a user is described in greater detail in Gerbasi U.S. Pat. No. 8,731,373, issued May 20, 2014, which is hereby incorporated by reference herein in its entirety.

In some embodiments, the media guidance application may, when receiving for each device in the set of devices, the data indicating whether the devices in the set are able to actively interact with the user, determine how each device takes input. Specifically, the media guidance application may, when receiving for each device in the first set of devices, the data indicating whether each device in the first set of devices is perceptible to the user, determine an input capability of each device in the first set of devices. For example, the media guidance application may determine an input capability of each device (e.g., audio input, input via instructions from a network, video input, or another suitable capability). The media guidance application may retrieve the input capability from a database from a profile for each device. The media guidance application may determine that the database and profile were defined by an editor (e.g., the device manufacturer).

The media guidance application may send a command to each device to collect input. Specifically, the media guidance application may instruct each device of the first set of devices, based on a respective input capability, to collect input. For example, the media guidance application may instruct each device (e.g., built in microphone to the TV, security camera, or another suitable input) to collect an input (e.g., sounds from the surrounding environment, video from the surrounding environment, or another suitable input). The media guidance application may transmit instructions to each device of the first set of devices to collect an input over the network.

The media guidance application play determine from the collected input whether the device can detect and interact with the user (i.e., is perceptible to the user). Specifically, the media guidance application may determine, from the collected input, whether each device in the first set of devices is able to detect the user. For example, the media guidance application may determine from the collected input (e.g., a frame of the position of the user with relation to the device) whether each device in the first set of devices is able to detect the user (e.g., whether the user is facing the device). As another example, the media guidance application may determine from the collected input (e.g., a detected utterance from the user) whether each device in the first set of devices is able to detect the user (e.g., whether each device is able to detect an utterance, and based on a determined location of the utterance (e.g., by triangulating the audio signals at different devices), determining whether the user is within range of an audio output from the device). As yet another example, the media guidance application may determine from the collected input (e.g., a location of the user), whether each device in the first set of devices is able to detect the user (e.g., the user is within a certain radius of a network-connected device so that the device is enabled to alert (e.g., call) emergency services).

In some embodiments, the media guidance application may determine that the collected data corresponds to an audio input. The media guidance application may determine the position of the user based on the characteristics of the audio signal (e.g., by triangulating the user's position from multiple audio signal inputs from devices positioned at various locations in environment 100). The media guidance application may then compare the user's location and position to each device to device capabilities (e.g., range of audio or video signal, etc.) to determine whether each device is able to detect the user (e.g., the device is in range of the user's position).

In some embodiments, the media guidance application may determine that the collected data corresponds to a video input (e.g., image frames from a camera). The media guidance application may determine the position of the user based on analyzing an image frame (e.g., determining the user's position in reference to a control image of user environment 100). The media guidance application may then compare the user's location and position to each device to device capabilities (e.g., range of audio or video signal, etc.) to determine whether each device is able to detect the user (e.g., the device is in range of the user's position and the user facing the device).

In some embodiments, the media guidance application may send a command, using an API, to a device to request the device's capabilities. Specifically, the media guidance application may, when determining the input capability of each device in the first set of devices, transmit, using an Application Programming Interface ("API"), to a device of the first set of devices a request for device capabilities. For example, the media guidance application may transmit, using an API, to a device (e.g., a television) of the first set of devices a request for device capabilities (e.g., audio, video, etc.).

The media guidance application may receive, from the first device a response that includes the device capabilities. Specifically, the media guidance application may receive, from the first device using the API, a response that includes the device capabilities. For example, the media guidance application may receive, from the first device (e.g., a television) using the API, a response that includes the device capabilities (e.g., audio and video output).

In some embodiments, the media guidance application may, when receiving for each device in the set of devices whether the device can detect and interact with the user, monitor input for each of the devices. Specifically, the media guidance application may, when receiving for each device in the first set of devices, the data indicating whether each device in the first set of devices is perceptible to the user, monitor input for each of the plurality of devices of the user. For example, the media guidance application may monitor input for each of the plurality of devices of the user (e.g., television, speaker, etc.). The media guidance application may periodically transmit a request to each of the plurality of devices requesting the device to transmit any input that was received during that period, if applicable.

The media guidance application may detect, based on the monitored input, whether the device can detect the user. Specifically, the media guidance application may detect, based on monitored input, that the user is detectable by a first device of the plurality of devices. For example, the media guidance application may detect, based on monitored input (e.g., a frame showing the user facing the television), that the user is detectable by a first device (e.g., the television) of the plurality of devices. The media guidance application may determine whether the user is detectable by the first device using the methods described above.

The media guidance application may notify the user, during the incident that the user is currently dealing with, that the device is available to the user. Specifically, the media guidance application may notify the user, during the event, that the device is available to the user. For example, the media guidance application may notify the user (e.g., via an audible alert, a visual alert, or another suitable alert) that the device (e.g., the television) is available to the user during the event.

In some embodiments, the media guidance application may notify the user that the device is available to the user by generating an alert on the available device (e.g., an auditory or visual alert). For example, the media guidance application may generate a visual alert on the available device (e.g., an overlay on a device that supports visual functions).

In some embodiments, the media guidance application may generate an alert on a wearable device associated with the user (e.g., such an Apple Watch).

In some embodiments, the media guidance application may list a second set of devices that includes devices that can detect and interact with the user. Specifically, the media guidance application may generate, based on the data indicating whether each device in the first set of devices is perceptible to the user, a second set of devices that includes devices of the first set that are perceptible to the user. As referred to herein, devices that are perceptible to the user are devices that detect the user's communications, whether a visual and/or voice communication. For example, for a device with video capabilities, the device is perceptible to the user if the user's view towards the device is not obstructed. As another example, for a device with audio capabilities, the device is perceptible to the user if the user is within hearing range of the device. As yet another example, the device is perceptible to the user when the user is facing the device. For example, the media guidance application may generate, based on the data indicating whether each device in the first set of devices is perceptible to the user, a second set of devices (e.g., the television, the speakers, the alarm system) that include devices of the first set (e.g., the television, the speakers).

In some embodiments, the media guidance application may determine that the second set of devices are all devices in environment 100 that can interact with the user, while the first set of devices are the threshold amount of devices that represent the devices that are most perceivable to the user. For example, the media guidance application may determine that the first set of devices are devices favorited by the user in a profile for the user. As another example, the media guidance application may determine that the first set of devices are the threshold amount of devices closest to the user that can perceive the user.

In some embodiments, the media guidance application may send a command to each device in the second set of devices to provide the potential device responses that aid the user with their current situation. Specifically, the media guidance application may instruct each device in the second set of devices to provide the functions associated with the event. For example, the media guidance application may instruct each device in the second set of devices (e.g., the television, the speakers, the alarm system) to provide functions (e.g., play a CPR video, play audio instructions for how to perform the Heimlich maneuver, alert emergency services, or perform another suitable function) associated with the event (e.g., a medical emergency). The media guidance application may instruct each device in the second set of devices to provide functions associated with the event in the same manner as described above with relation to instructing each device in the first set of devices to provide functions.

In some embodiments, the media guidance application may, when sending a command to each device in the second set of devices to provide the potential device responses that aid the user with their current situation, determine that a video clip is available that is related to the user's current situation. Specifically, the media guidance application may, when instructing each device in the second set of devices to provide the functions associated with the event, determine that a media asset is available that is related to the event. For example, the media guidance application may determine that a media asset is available (e.g., a video of how to give the Heimlich maneuver) that is related to the event (e.g., medical emergency involving choking). The media guidance application may retrieve a media asset related to the user's current situation from a datastore, where the datastore links metadata for the video to metadata for the event. The media guidance application may retrieve a media asset where the metadata matches metadata for the event. For example, the media guidance application may determine that the metadata for the media asset (e.g., title: "Heimlich techniques" keywords: Heimlich, emergency, safety, choking) matches the metadata for the event (e.g., keywords: choking, emergency, Heimlich). The media guidance application may determine that "emergency," "choking," and "Heimlich" match.

The media guidance application may determine, based on information about a piece of media, that a device in the second set of devices can play the piece of media. Specifically, the media guidance application may determine, based on a type of media asset, a device of the second set of devices that is able to play the media asset. For example, the media guidance application may determine, based on a type of media asset (e.g., video, audio, or another suitable type), a device (e.g., a television) of the second set of devices that is able to play the media asset (e.g., a video on how to perform the Heimlich maneuver). The media guidance application may determine, based on comparing the capabilities of the device and the metadata of the video asset, whether the device can play the media asset.

The media guidance application may play the media clip using the device that is able to play the media clip. Specifically, the media guidance application may play the media asset using the device of the second set of devices that is able to play the media asset. For example, the media guidance application may play the media asset (e.g., a video on how to perform the Heimlich maneuver) using the device (e.g., the television) of the second set of devices that is able to play the media asset.

In some embodiments, the media guidance application may, when sending a command to each device in the second set of devices to provide the potential device responses that aid the user with their current situation, determine a potential device response that the user wants based on detecting what the user says. Specifically, the media guidance application may, when instructing each device in the second set of devices to provide the functions associated with the event, determine a function that the user desires based on a user's utterance. For example, the media guidance application may determine a function that the user desires (e.g., a video of how to perform the Heimlich maneuver) based on the user's utterance (e.g., the user saying that someone is choking). The media guidance application may determine a textual representation of the user's utterance, as described above. The media guidance application may generate keywords from the textual representation, and compare the keywords to a keyword datastore that links identifiers to keywords to identify an identifier. The media guidance application may determine potential functions that the user desires by comparing the identifier to the database that links functions to identifiers.

The media guidance application may determine whether the potential device response that the user desires can be provided using one of the devices in the second set of devices. Specifically, the media guidance application may determine whether the function that the user desires can be provided using a device of the second set of devices. For example, the media guidance application may determine whether the function required (e.g., a video of how to perform the Heimlich maneuver) can be provided using a device (e.g., Bluetooth speakers) of the second set of devices. The media guidance application may determine whether the functions may be provided using a device of the second set of devices using similar methods as described above.

In response to determining that the device response that the user desires cannot be provided on any device in the second set of devices, the media guidance application may choose a device outside of the devices in the second set to provide the desired device response. Specifically, in response to determining that the function that the user desires cannot be provided using any device of the second set of devices, the media guidance application may use a device from the first set of devices that is not in the second set of devices to provide the function. For example, in response to determining that the function that the user desires (e.g., a video clip that is available for the event) cannot be provided using any device of the second set of devices (e.g., a computer, a television, Bluetooth speakers, etc.), the media guidance application may use a device from the first set of devices that is not in the second set of devices to provide the function (e.g., a television).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a band-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
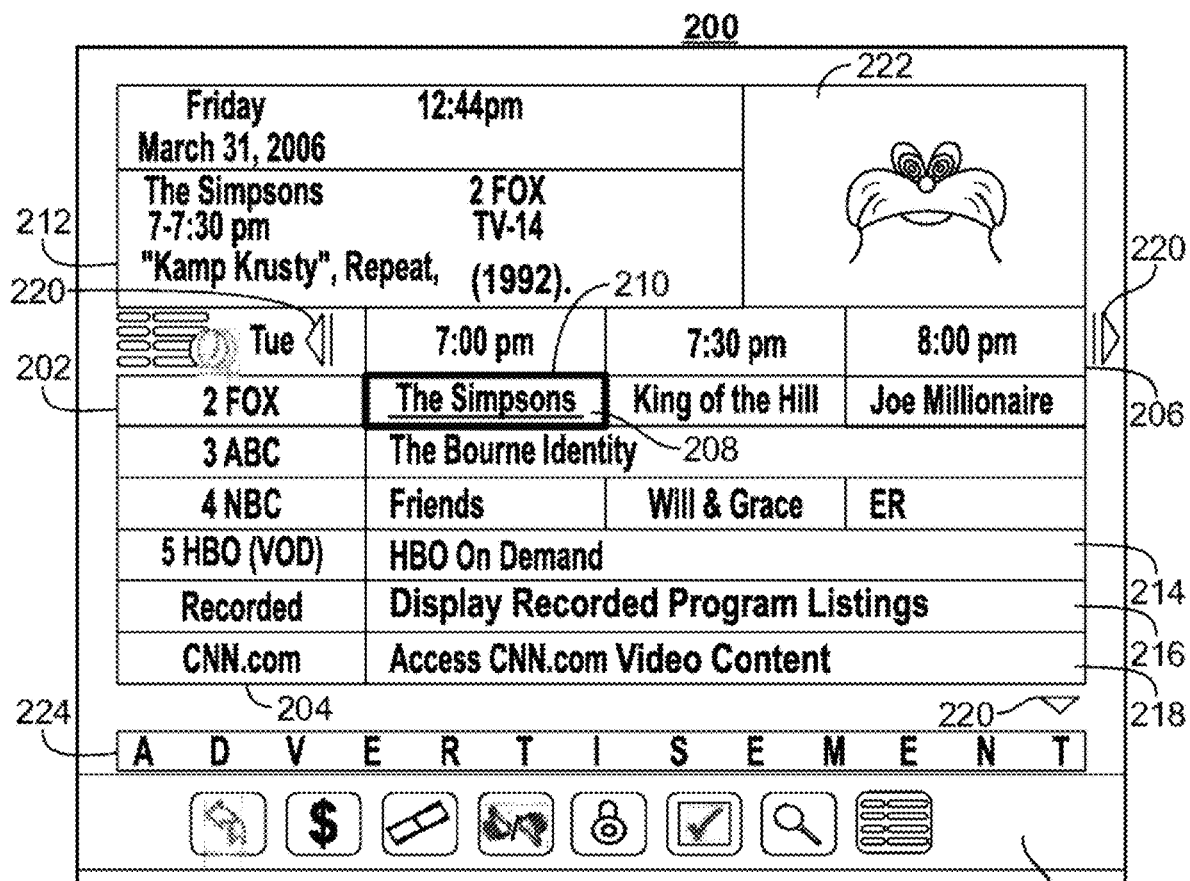
FIG. 2 shows an illustrative example of a display screen that may be used to provide media guidance application listings and other media guidance information in accordance with some embodiments of the disclosure.
Figure 3:
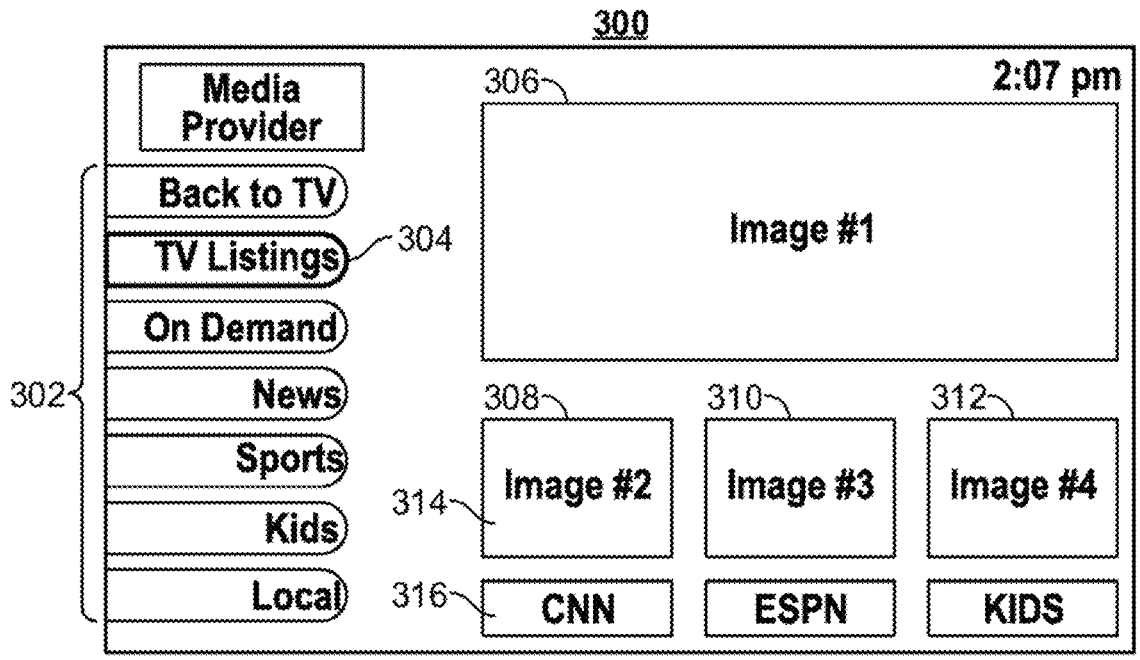
FIG. 3 shows another illustrative example of a display screen that may be used to provide media guidance application listings in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other pre-defined, user-defined, or other organization criteria.

FIG. 2 shows an illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in a response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003, and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an onscreen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
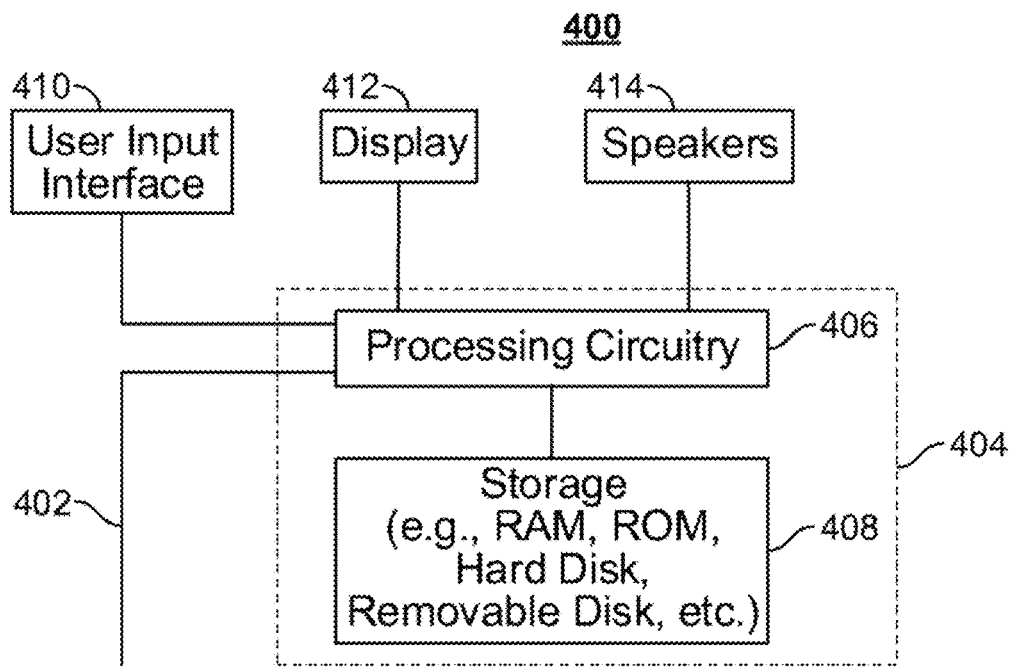
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408).

Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry, and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote, control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may generate for display the content of the displays locally on equipment device 400. This way, the processing of the instructions is performed remotely by the server while the resulting displays are provided locally on equipment device 400. Equipment device 400 may receive input from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
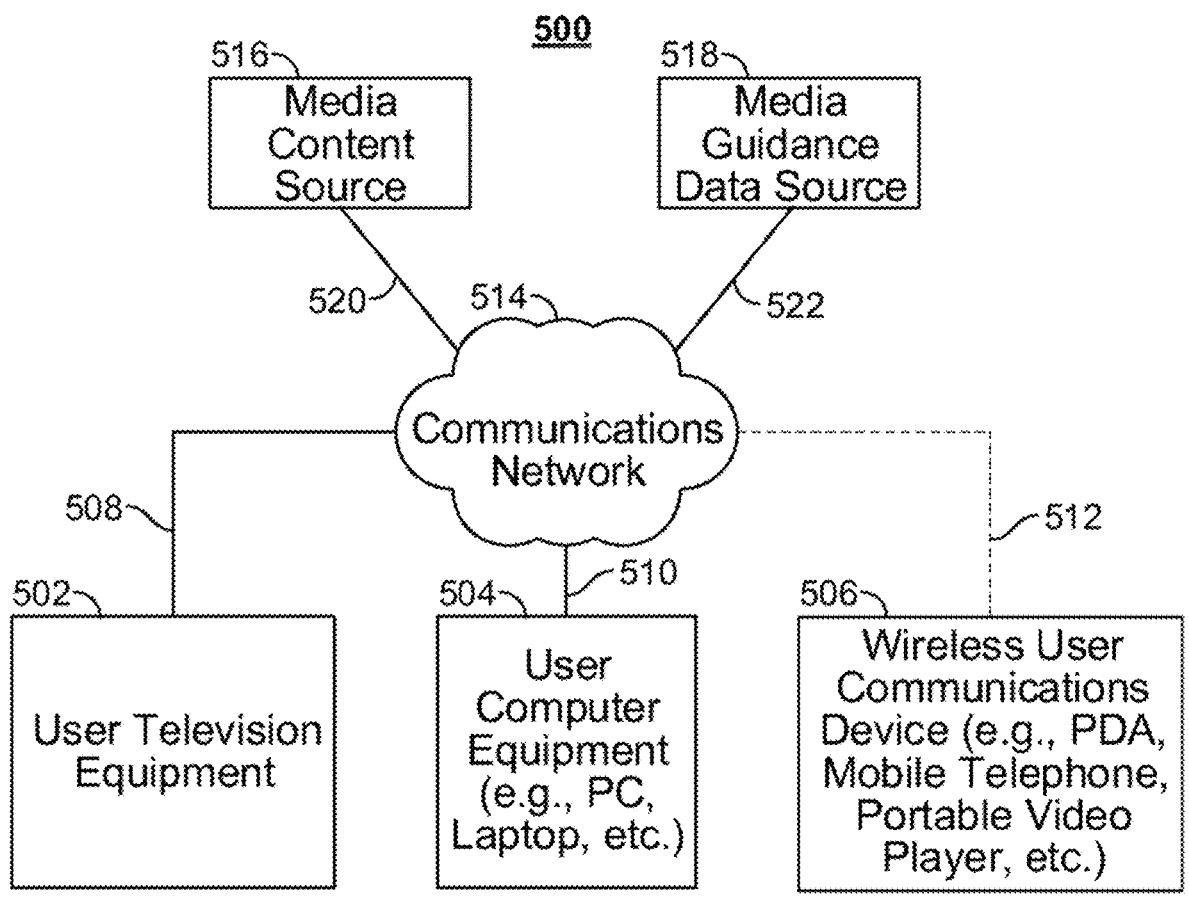
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification Mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office or a mobile device such as a PDA or web-enabled mobile telephone. The user may set various settings (e.g., recordings, reminders, or other settings) on the online guidance application to control the user's in-home equipment. The online guide may control the user's equipment directly or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources referred to as "the cloud." For example, the cloud can include a collection of server computing devices, which may be located centrally or at distributed locations, that provide cloud-based services to various types of uses and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers or through other providers of online services. For example, the cloud-based services can include a content storage service, a content sharing site, a social networking site, or other services via which user-sourced content is distributed for viewing by others on connected devices.

These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
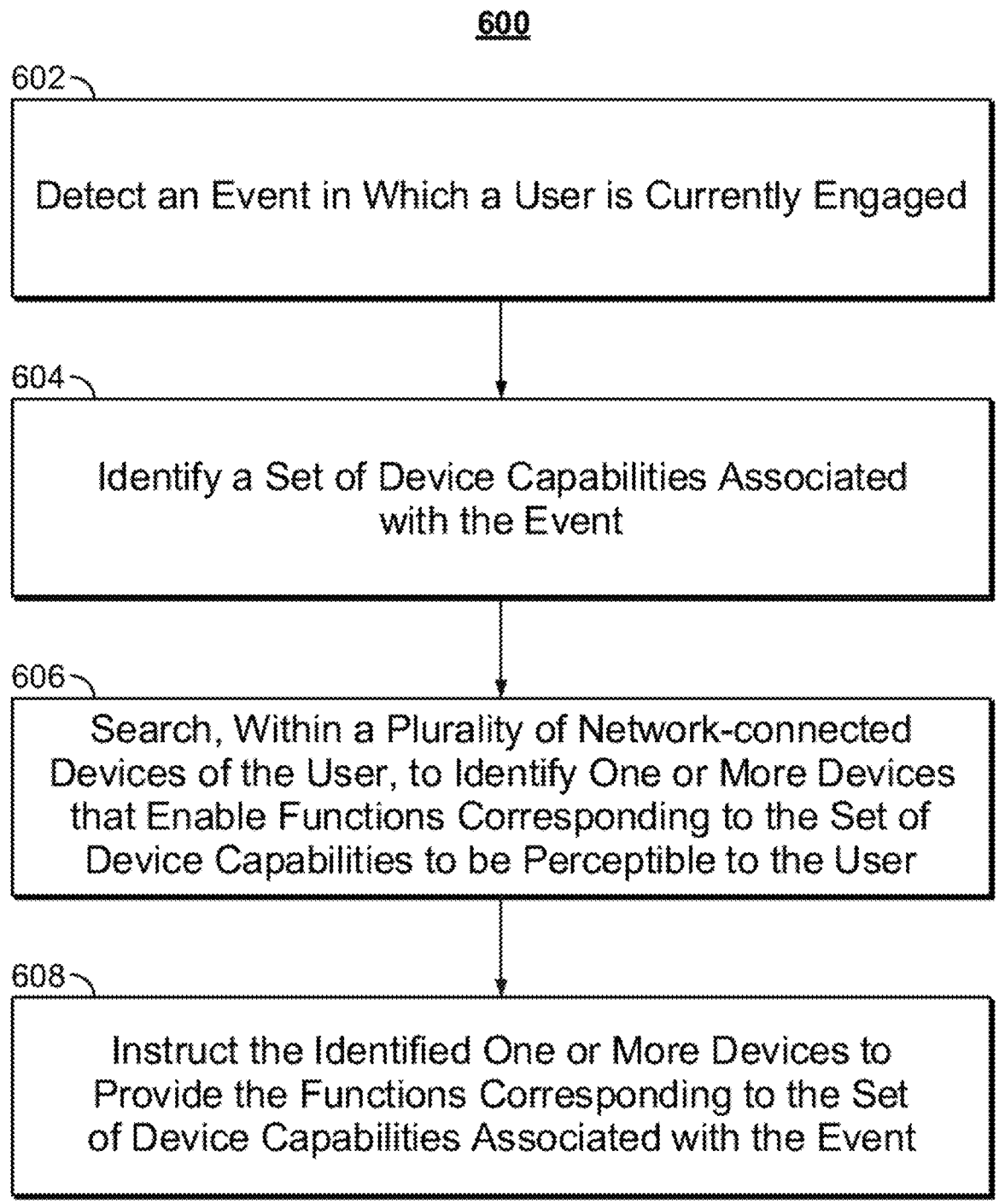
FIG. 6 depicts an illustrative flowchart of a process for selecting one or more network-connected devices to provide device functions required by an event in accordance with some embodiments of the disclosure.

FIG. 6 depicts an illustrative flowchart of a process for managing local and cloud storage space for a plurality of media assets in accordance with some embodiments of the disclosure. Process 600, and any of the following processes, may be executed by control circuitry 404 (e.g., in a manner instructed to control circuitry 404 by the media guidance application). Control circuitry 404 may be part of user equipment (e.g., user equipment 106, which may have arty or all of the functionality of user television equipment 502, user computer equipment 504, and/or wireless communications device 506), or of a remote server separated from the user equipment by way of communication network 514, or distributed over a combination of both.

At 602, control circuitry 404 detects an event in which a user is currently engaged. Control circuitry 404 detects the event in which the user is currently engaged using user computer equipment 504, user television equipment 502, or wireless user communications device 506, or a combination of the above. At 604, control circuitry 404 identifies a set of device capabilities associated with the event. Control circuitry 404 retrieves the set of device capabilities by transmitting a request for the capabilities over communications network 514 to media guidance data source 518.

At 606, control circuitry 404 searches, within a plurality of network-connected devices of the user, to identify one or more devices that enable functions corresponding to the set of device capabilities to be perceptible to the user. Control circuitry 404 searches within user television equipment 502, user computer equipment 504, or wireless user communications device 506, or a combination of the above, which are connected to communications network 514.

At 608, control circuitry 404 instructs the identified one or more devices to provide the functions corresponding to the set of device capabilities associated with the event. Control circuitry 404 instructs the identified one or more devices by transmitting instructions over communication network 514 to provide functions corresponding to the set of device capabilities associated with the event.

Figure 7:
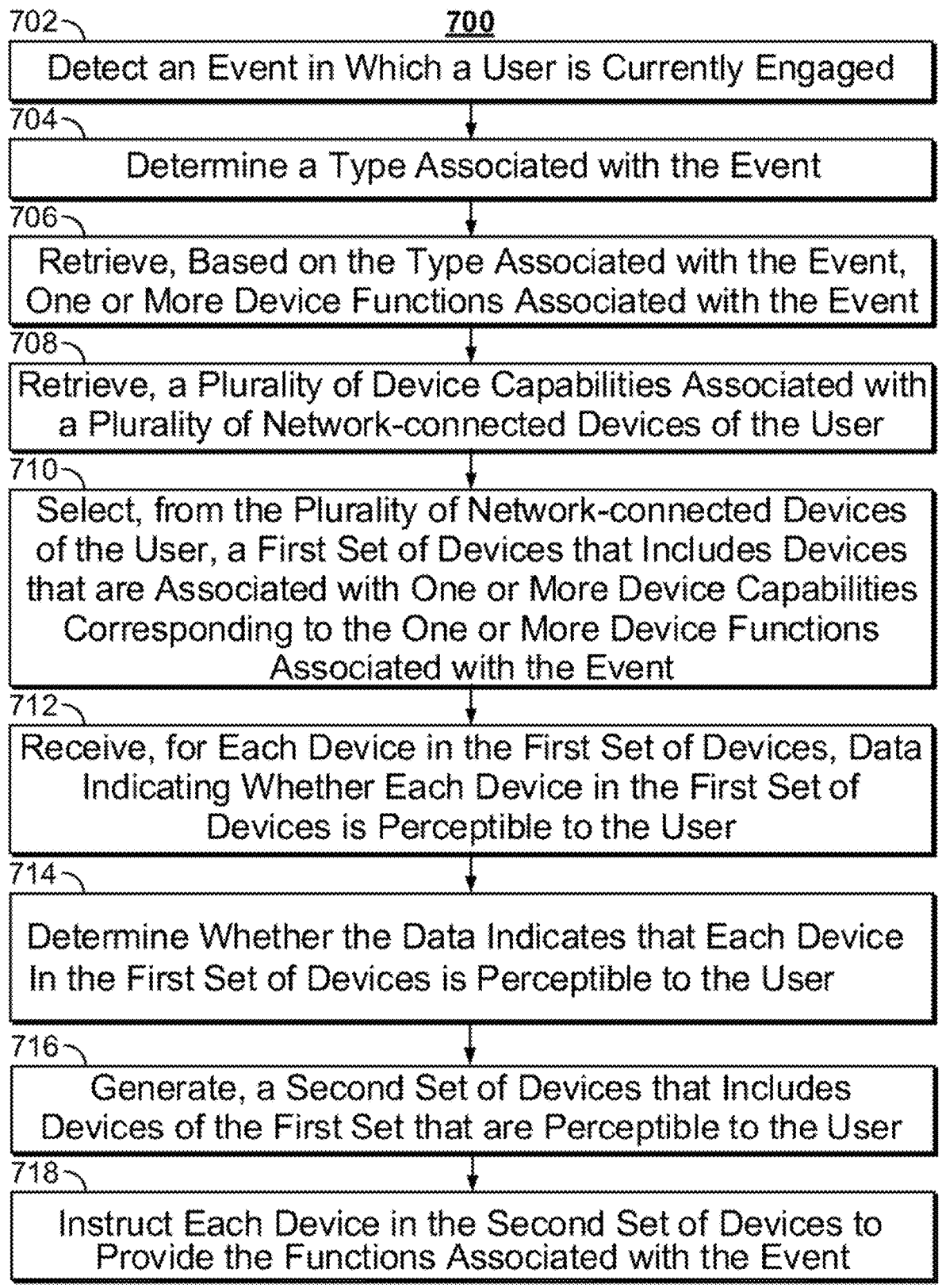
FIG. 7 depicts another illustrative flowchart of a process for selecting one or more network-connected devices to provide device functions required by an event in accordance with some embodiments of the disclosure.

FIG. 7 depicts another illustrative flowchart of a process for selecting one or more network-connected devices to provide device functions required by an event in accordance with some embodiments of the disclosure. Process 700 begins at 702. At 702, control circuitry 404 detects an event in which a user is currently engaged. Control circuitry 404 detects the event in which the user is currently engaged using user computer equipment 504, user television equipment 502, or wireless user communications device 506, or a combination of the above.

At 704, control circuitry 404 determines a type associated with the event. Control circuitry 404 retrieves the type associated with the event from media guidance data source 518 based on an event identifier. At 706, control circuitry 404 retrieves, based on the type associated with the event, one or more device functions associated with the event. Control circuitry 404 retrieves one or more device functions associated with the event from media guidance data source 518 via communications network 514 or from a database in storage 408.

At 708, control circuitry 404 retrieves, a plurality of device capabilities associated with a plurality of network-connected devices of the user. At 710, control circuitry 404 selects, from the plurality of network-connected devices of the user, a first set of devices that includes devices that are associated with one or more device capabilities corresponding to the one or more device functions associated with the event.

At 712, control circuitry 404 receives, for each device in the first set of devices, data indicating whether each device in the first set of devices is perceptible to the user. Control circuitry 404 receives, for each device in the first set of devices, data (e.g., device input data) indicating whether each device in the first set of devices is perceptible to the user from media guidance data source 518 over communications network 514, or from a database in storage 408.

At 714, control circuitry 404 determines whether the data indicates that each device in the first set of devices is perceptible to the user. Control circuitry 404 determines whether the data indicates that each device in the first set of devices is perceptible to the user using similar methods as described in detail above. At 716, control circuitry 404 generates a second set of devices that includes devices of the first set that are perceptible to the user. Control circuitry 404 generates a second set of devices that includes devices of the first set that are perceptible to the user from user television equipment 502, user computer equipment 504, or wireless user communications device 506, or any combination of the above. At 718, control circuitry 404 instructs each device in the second set of devices to provide the functions associated with the event. Control circuitry 404 instructs each device in the second set of devices to provide functions associated with the event by transmitting instructions over communications network 514.

Figure 8:
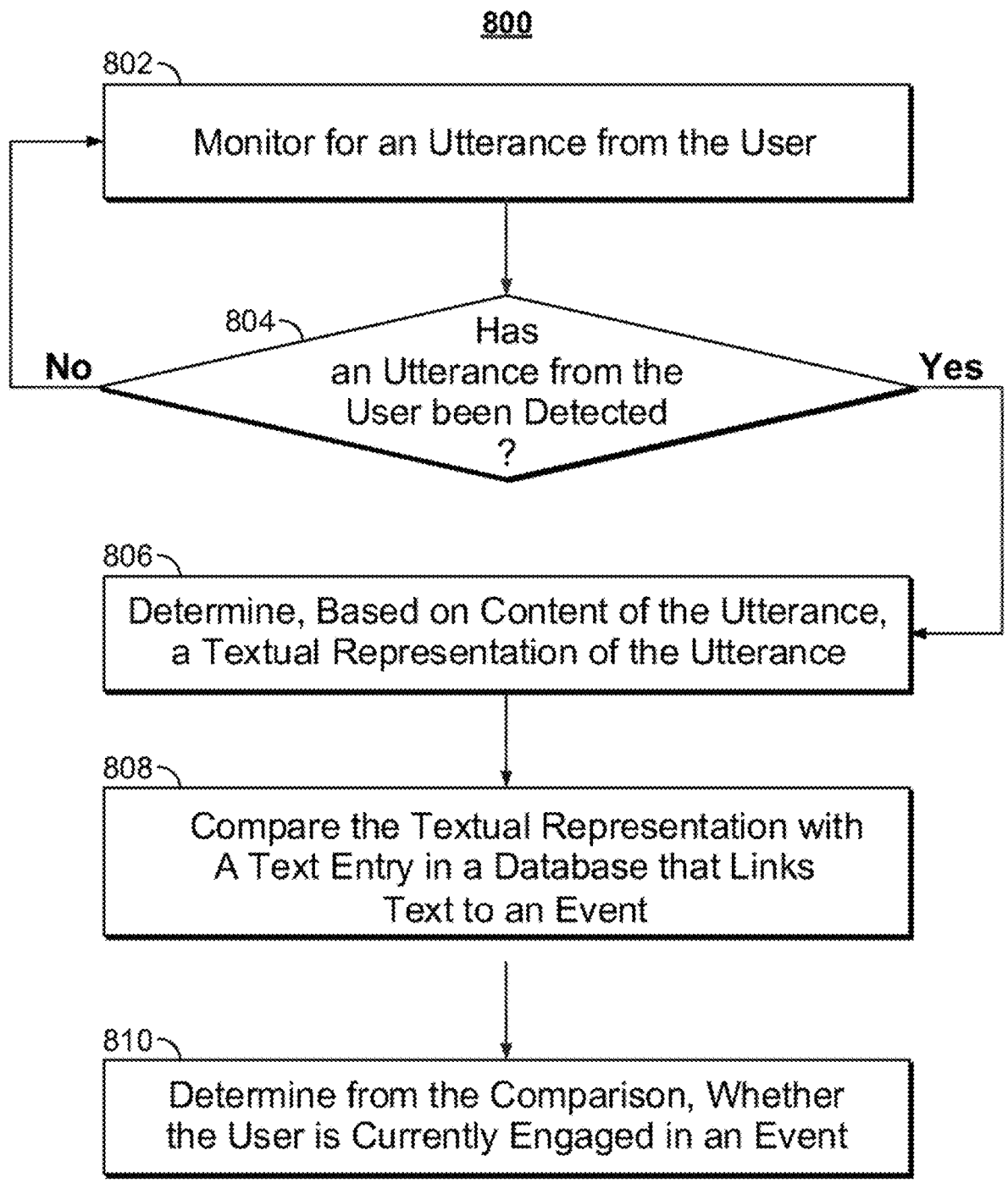
FIG. 8 depicts an illustrative flowchart of a process for determining whether a user is engaged in an event in accordance with some embodiments of the disclosure.

FIG. 8 depicts an illustrative flowchart of a process for determining whether a user is engaged in an event in accordance with some embodiments of the disclosure. Process 800 begins at 802. At 802, control circuitry 404 monitors for an utterance from the user. Control circuitry 404 monitors for an utterance from the user from any device that has speech detection capabilities (e.g., a microphone), such as any device from user television equipment 502, user computer equipment 504, or wireless user communications device 506, or any combination of the above.

At 804, control circuitry 404 determines whether an utterance from the user been detected. Control circuitry 404 determines whether an utterance from the user has been detected based on inputs retrieved over communications network 514 from one or more devices. If, at 804, control circuitry 404 determines that "No," an utterance from the user has not been detected, then 804 reverts to process 802. If, at 804, control circuitry 404 determines that "Yes," an utterance from the user has been detected, then 804 proceeds to process 806. At 806, control circuitry 404 determines, based on content of the utterance, a textual representation of the utterance. Control circuitry 404 uses processing circuitry 406 to parse the utterance (e.g., using speech-to-text) to determine a textual representation of the utterance. At 808, control circuitry 404 compares the textual representation to a text entry in a database that links text to an event. Control circuitry 404 retrieves the database from storage 408 or from a remote server via communications network 514 or any combination of the two. Control circuitry 404 compares the textual representation to the text entry using processing circuitry 406. At 810, control circuitry 404, determines from the comparison, whether the user is currently engaged in an event. Control circuitry 404 determines, based on the comparison, whether the user is currently engaged in an event using similar methods as described in detail above.

Figure 9:
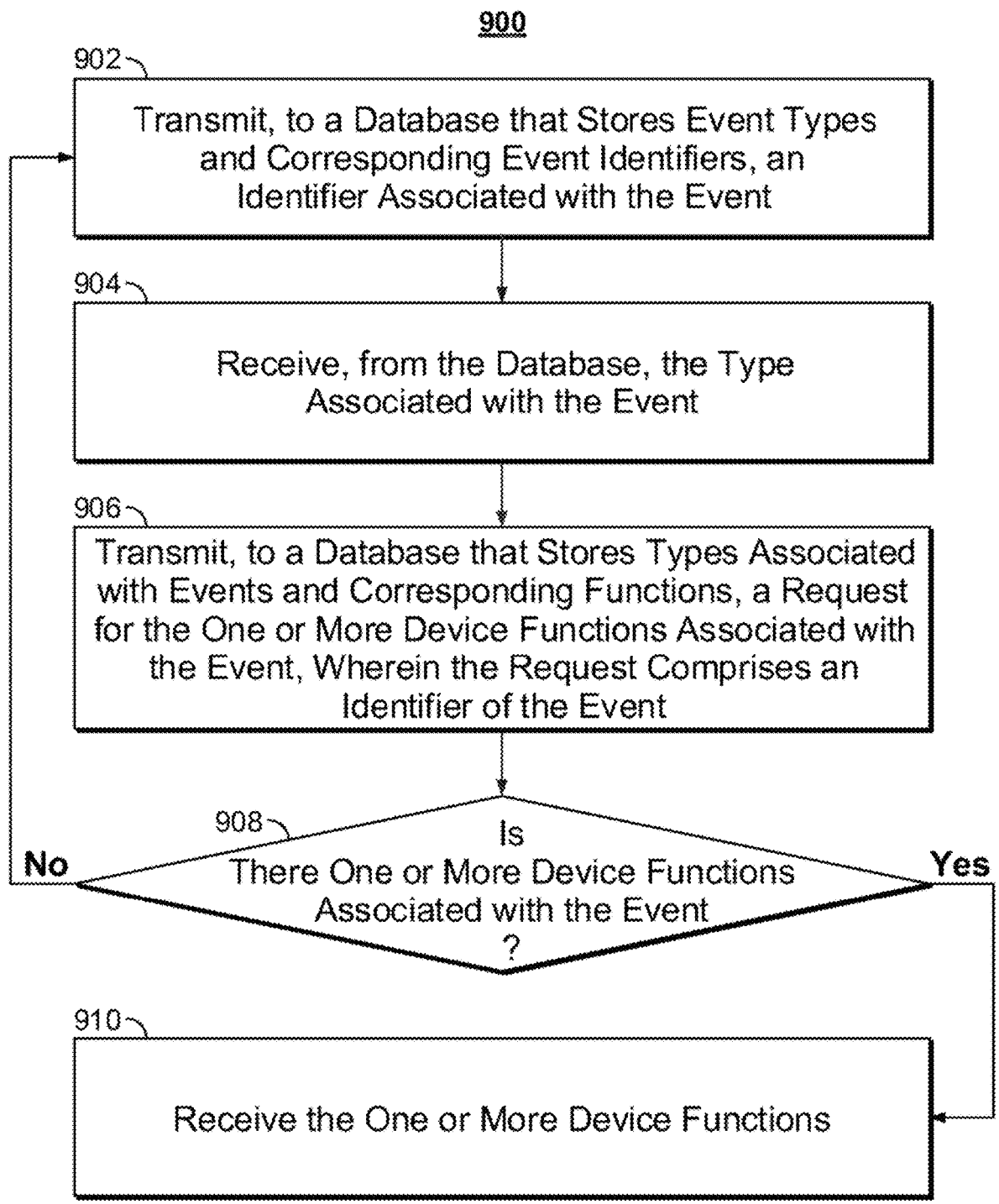
FIG. 9 depicts an illustrative flowchart of a process for determining device functions corresponding to the event based on the type of the event in accordance with some embodiments of the disclosure.

FIG. 9 depicts an illustrative flowchart of a process for determining device functions corresponding to the event based on the type of the event in accordance with some embodiments of the disclosure. Process 900 begins at 902. At 902, control circuitry 404 transmits, to a database that stores event types and corresponding event identifiers, an identifier associated with the event. Control circuitry 404 transmits, to a database in storage 408 or stored on a remote server and accessed over communications network 514 that stores event types and corresponding event identifiers, an identifier associated with the event.

At 904, control circuitry 404 receives, from the database, the type associated with the event. Control circuitry 404 retrieves the type from the database server over communications network 514. At 906, control circuitry 404 transmits, to a database that stores type associated with events and corresponding functions, a request for the one or more device functions associated with the event, where the request includes an identifier of the event. Control circuitry 404 transmits, via communications network 514, a request for one or more device functions associated with the event, where the request includes an identifier of the event.

At 908, control circuitry 404 determines whether there are one or more device functions associated with the event. If, at 908, control circuitry 404 determines that "No," there are not one or more device functions associated with the event, then 908 reverts to process 902. If, at 908, control circuitry 404 determines that "Yes," there are one or more device functions associated with the event, then 908 proceeds to process 910. At 910, control circuitry 404 receives the one or more device functions. Control circuitry 404 receives the one or more device functions via communications network 514.

Figure 10:
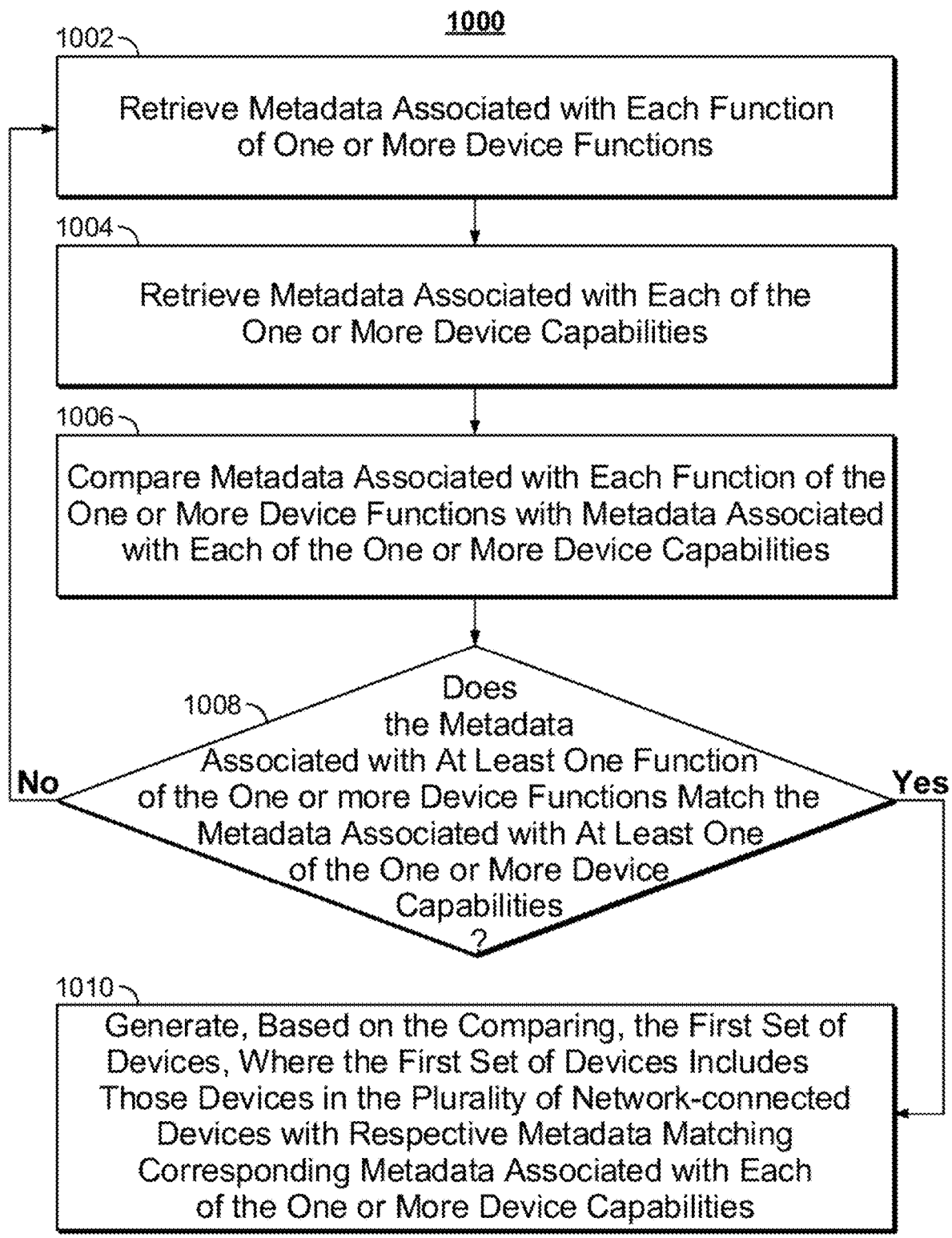
FIG. 10 depicts an illustrative flowchart of a process for determining, based on metadata, devices with the capabilities to provide selected functions in accordance with some embodiments of the disclosure.

FIG. 10 depicts an illustrative flowchart of a process for determining, based on metadata, devices with the capabilities to provide selected functions in accordance with some embodiments of the disclosure. At 1002, control circuitry 404 retrieves metadata associated with each function of one or more device functions. Control circuitry 404 retrieves metadata associated with each function of one or more functions from media guidance data source 518 over communications network 514. At 1004, control circuitry 404 retrieves metadata associated with each of the one or more device capabilities. Control circuitry 404 retrieves metadata associated with each of the one or more device capabilities from media guidance data source 518 over communications network 514.

At 1006, control circuitry 404 compares metadata associated with each function of the one or more device functions with metadata associated with each of the one or more device capabilities. Control circuitry 404 compares the metadata associated with each function of the one or more devices with metadata associated with each of the one or more device capabilities using processing circuitry 406.

At 1008, control circuitry 404 determines whether the metadata associated with at least one function of the one or more device functions matches the metadata associated with at least one of the one or more device capabilities. If, at 1008 control circuitry 404 determines that "No," the metadata associated with at least one function of the one or more device functions does not match the metadata associated with at least one of the one or more device capabilities, then 1008 reverts to process 1002. If, at 1008 control circuitry 404 determines that "Yes," the metadata associated with at least one function of the one or more device functions matches the metadata associated with at least one of the one or more device capabilities, then 1008 proceeds to process 1010.

At 1010, control circuitry 404 generates, based on the comparing, the first set of devices, where the first set of devices includes those devices in the plurality of network-connected devices with respective metadata matching corresponding metadata associated with each of the one or more device capabilities. Control circuitry 404 generates the first set of devices using similar methods as described in detail above.

Figure 11:
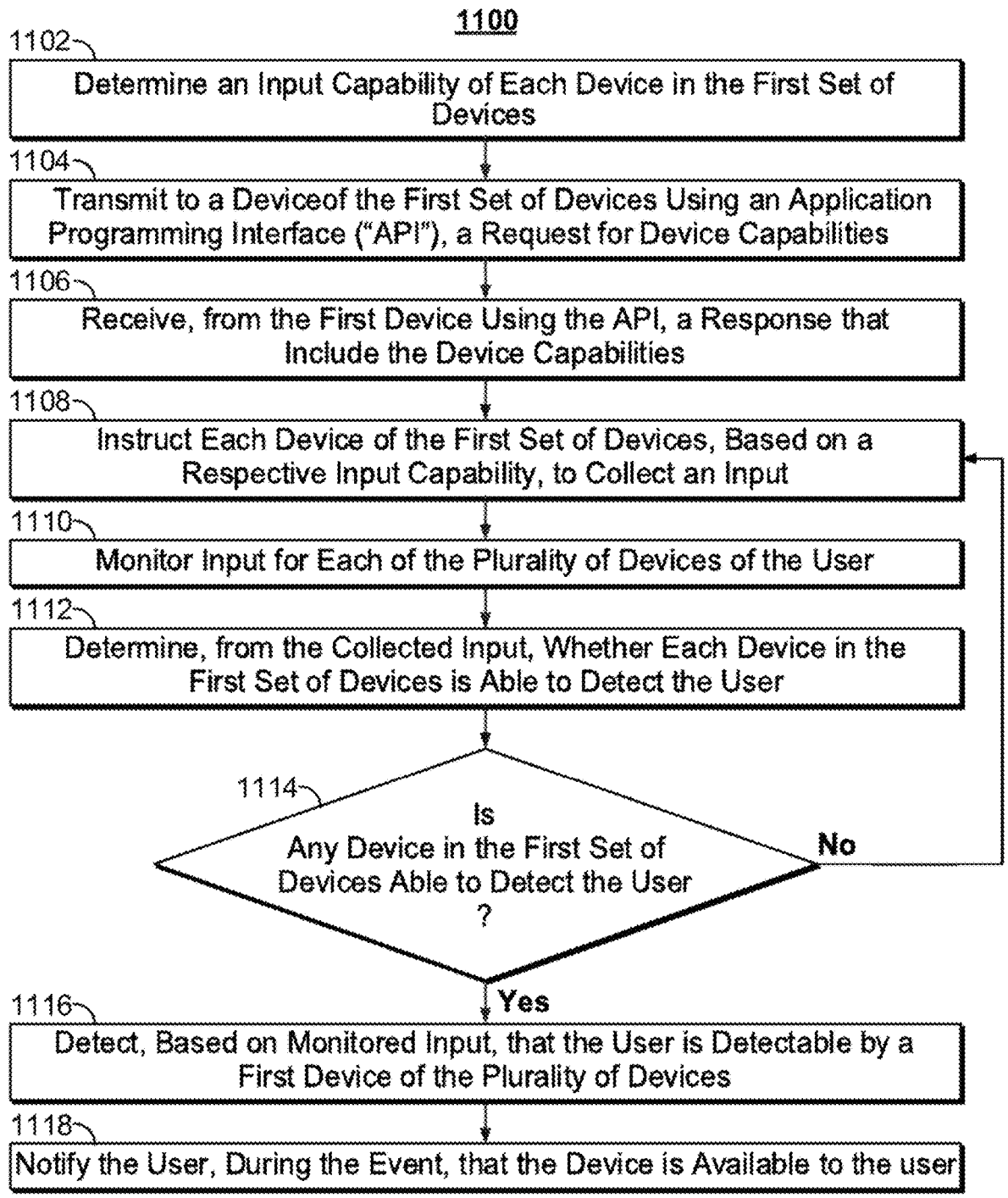
FIG. 11 depicts an illustrative flowchart of a process for determining whether the user is detectable by a device in accordance with some embodiments of the disclosure.

FIG. 11 depicts an illustrative flowchart of a process for determining whether the user is detectable by a device in accordance with some embodiments of the disclosure. At 1102, control circuitry 404 determines an input capability of each device in the first set of devices. Control circuitry 404 determines an input capability of each device in the set of devices based on retrieved device capabilities from media guidance data source 518. At 1104, control circuitry 404 transmits to a device, using an Application Programming Interface ("API"), of the first set of devices a request for device capabilities. Control circuitry 404 transmits over communications network 514, using an API, to a device a request for device capabilities.

At 1106, control circuitry 404 receives, from the first device using the API, a response that include the device capabilities. Control circuitry 404 receives, from the first device using the API, a response (e.g., over communications network 514) that includes device capabilities. At 1108, control circuitry 404 instructs each device of the first set of devices, based on a respective input capability, to collect an input. Control circuitry 404 instructs each device of the first set, via a command sent over communications network 514, based on a respective input capability, to collect an input.

At 1110, control circuitry 404 monitors input for each of the plurality of devices of the user. Control circuitry 404 monitors input for each of the plurality of devices of the user, which may comprise devices from user television equipment 502, user computer equipment 504, wireless user communications device 506, or any combination of the above. At 1112, control circuitry 404 determines, from the collected input, whether each device in the first set of devices is able to detect the user. Control circuitry 404 determines whether each device in the first set of devices is able to detect the user using methods as described in detail above.

At 1114, control circuitry 404 determines whether any device in the first set of devices is able to detect the user. If, at 1114, control circuitry 404 determines that "No," each device in the first set of devices is not able to detect the user, then 1114 reverts to process 1108. If, at 1114, control circuitry 404 determines that "Yes," each device in the first set of devices is able to detect the user, then 1114 proceeds to process 1116.

At 1116, control circuitry 404 detects, based on monitored input, that the user is detectable by a first device of the plurality of devices. Control circuitry 404 detects, based on monitored input, that the user is detectable by a first device of the plurality of devices using similar methods as described in detail above. At 1118, control circuitry 404 notifies the user, during the event, that the device is available to the user. Control circuitry 404 notifies the user during the event, via user input interface 410, display 412, speaker 414, or any combination of the above, that the device is available to the user.

Figure 12:
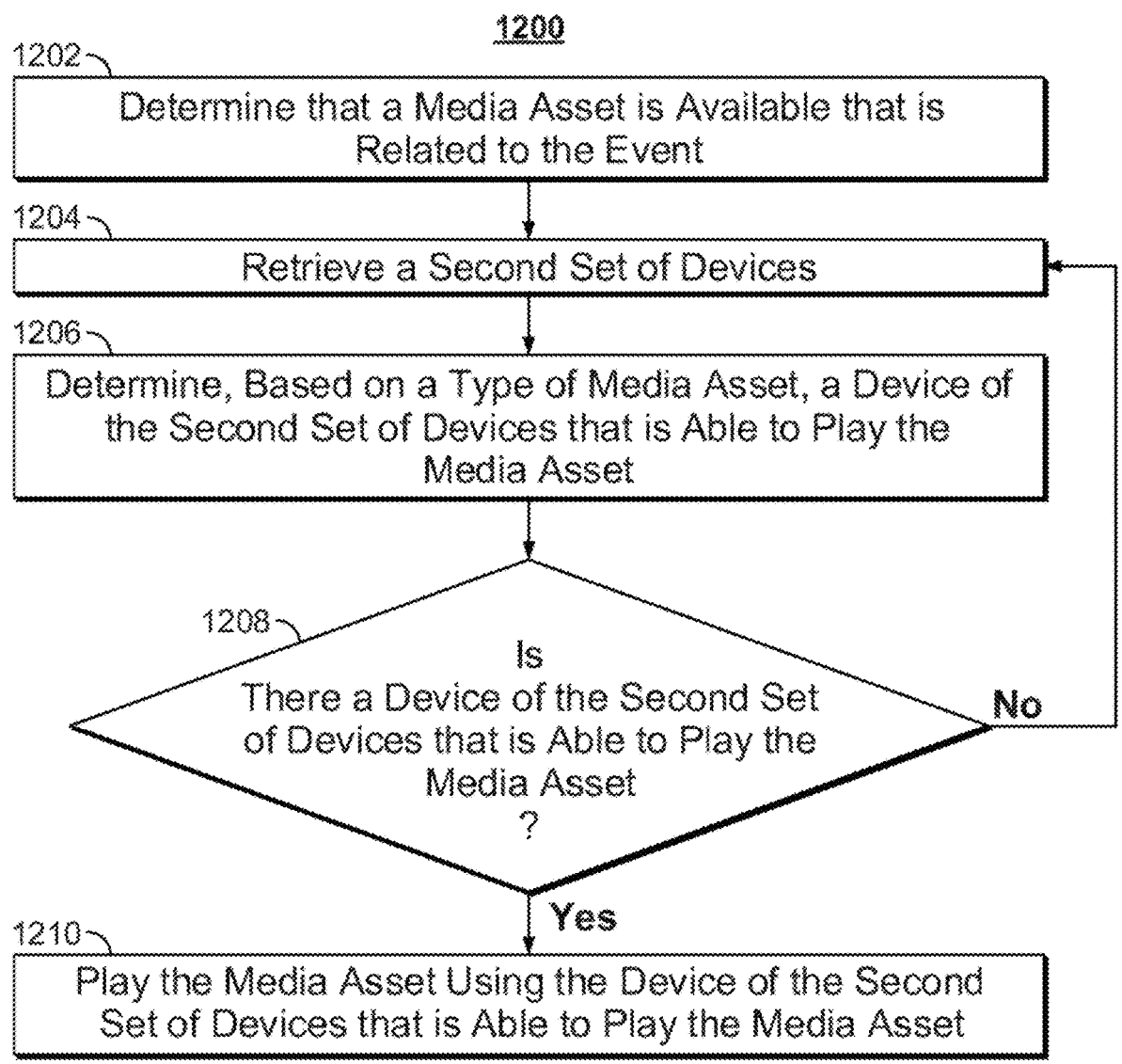
FIG. 12 depicts an illustrative flowchart of a process for identifying a device that can play a media asset that is related to the event in accordance with some embodiments of the disclosure.

FIG. 12 depicts an illustrative flowchart of a process for identifying a device that can play a media asset that is related to the event in accordance with some embodiments of the disclosure. At 1202, control circuitry 404 determines that a media asset is available that is related to the event. Control circuitry 404 retrieves a media asset from media content source 516 and the media asset's metadata from media guidance data source 518 to determine that it is available and related to the event. At 1204, control circuitry 404 retrieves a second set of devices. Control circuitry 404 retrieves the second set of devices from any device from user television equipment 502, user computer equipment 504, or wireless user communications device 506, display 412, speakers 414, or any combination of the above.

At 1206, control circuitry 404 determines, based on a type of media asset, a device of the second set of devices that is able to play the media asset. Control circuitry 404 determines, based on the type of media asset, a device of the second set of devices that is able to play the media asset using similar methods as described in detail above. At 1208, control circuitry 404 determines whether there is a device of the second set of devices that is able to play the media asset. If, at 1208, control circuitry 404 determines that "No," there is not a device of the second set of devices that is able to play the media asset, then 1208 reverts to 1204. If, at 1208, control circuitry 404 determines that "Yes," there is a device of the second set of devices that is able to play the media asset, then 1208 proceeds to 1210. At 1210, control circuitry 404 plays the media asset using the device of the second set of devices that is able to play the media asset. Control circuitry 404 plays the media asset using the device of the second set of devices using display 412 and speakers 414.

Figure 13:
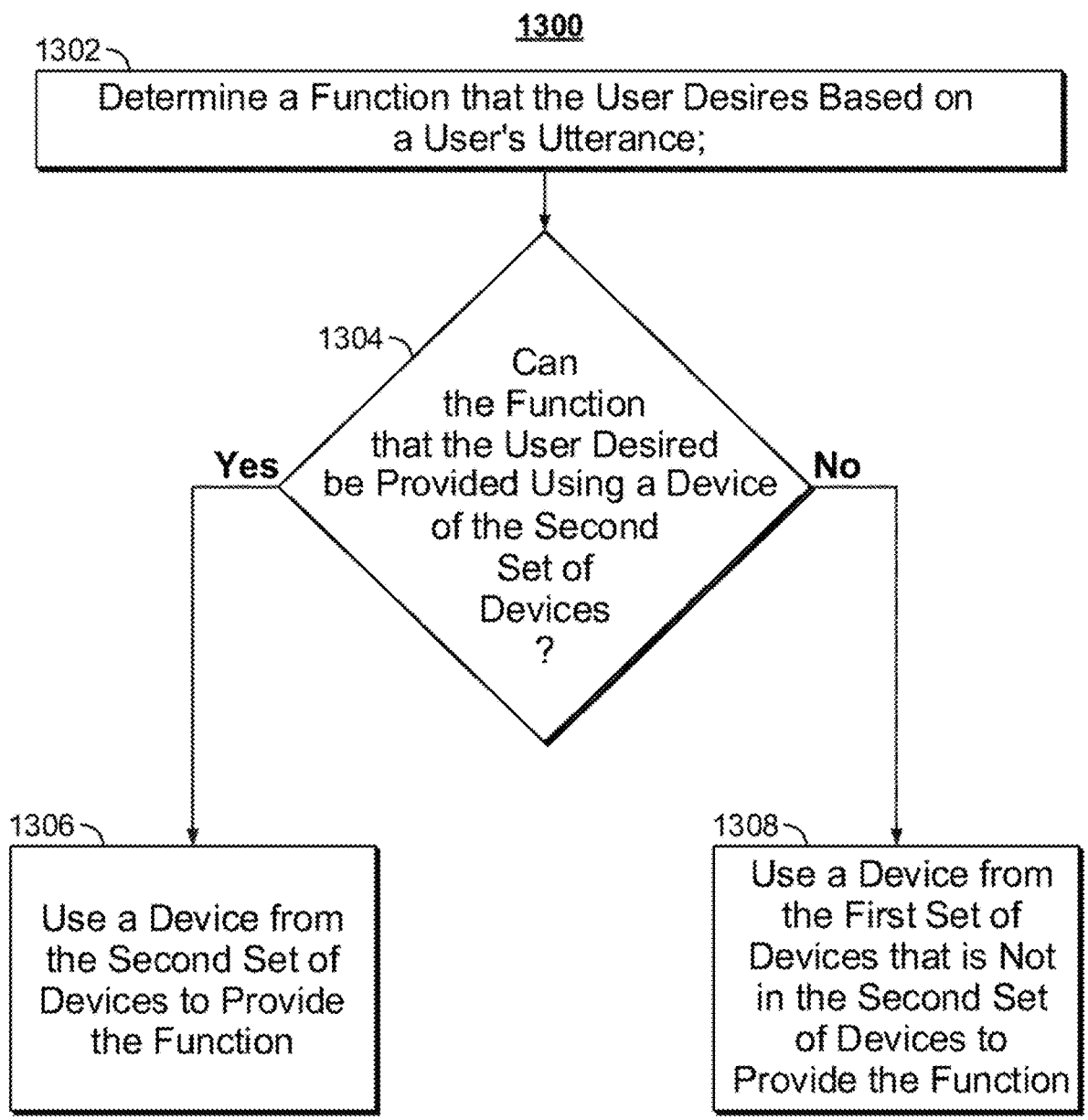
FIG. 13 depicts an illustrative flowchart of a process for determining a device that can provide a user-desired function in accordance with some embodiments of the disclosure.

FIG. 13 depicts an illustrative flowchart of a process for determining a device that can provide a user-desired function in accordance with some embodiments of the disclosure. At 1302, control circuitry 404 determines a function that the user desires based on a user's utterance. Control circuitry 404 retrieves the function that the user desires based on the user's utterance from a lookup table stored in storage 408 or accessed on a remote server via communications network 514. At 1304, control circuitry 404 determines whether the function that the user desires can be provided using a device of the second set of devices. Control circuitry 404 determines whether the function that the user desires can be provided using a device of the second set of devices using similar methods as described in detail above.

If, at 1304 control circuitry 404 determines that "Yes," the function that the user desires can be provided using a device of the second set of devices, then 1304 proceeds to 1306. At 1306, control circuitry 404 uses a device from the second set of devices to provide the function. Control circuitry 404 may use display 412, speaker 414, or any combination of the two to provide the function.

If, at 1304 control circuitry 404 determines that "No," the function that the user desires cannot be provided using a device of the second set of devices, then 1304 proceeds to 1308. At 1308, control circuitry 404 uses a device from the first set of devices that is not in the second set of devices to provide the function. Control circuitry 404 may use a device from the first set of devices that is not in the second set of devices to provide the function using similar methods as described in detail above.

It should be noted that processes 600-1300 or any step thereof could be performed on, or provided by, any of the devices shown in FIGS. 1 and 4-5. For example, any of processes 600-1300 may be executed by control circuitry 404 (FIG. 4) as instructed by control circuitry implemented on user equipment 502, 504, 506 (FIG. 5), and/or a user equipment device for selecting a recommendation. In addition, one or more steps of processes 600-1300 may be incorporated into or combined with one or more steps of any other process or embodiment.

It is contemplated that the steps or descriptions of each of FIGS. 6-13 may be used with any other embodiment of this disclosure. In addition, the steps and descriptions described in relation to FIGS. 6-13 may be done in alternative orders or in parallel to further the purposes of this disclosure. For example, each of these steps may be performed at any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-13.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC) or a field-programmable gate array (FPGA) within user equipment 400, media content source 516, or media guidance data source 518. For example, a profile, as described herein, may be stored in, and retrieved from, storage 408 of FIG. 4 or media guidance data source 518 of FIG. 5. Furthermore, processing circuitry or a computer program may update settings of user equipment 100 stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders or done in parallel. In addition, the systems and methods described herein may be performed in real time. It should also be noted, the systems and/or methods described above may be applied to, or used in accordance with, other systems and/or methods.

While some portions of this disclosure may make reference to "related art" or "convention," any such reference is merely for the purpose of providing context to the invention(s) of the instant disclosure and does not form any admission as to what constitutes the state of the art.

What is claimed is:

1. A method comprising:
   identifying a plurality of network-connected devices;
   detecting, by a first subset of the plurality of network-connected devices, an event in which a user is currently engaged, wherein the event is of an event type;
   retrieving, based on the event type and from a database of a plurality of device responses associated with a plurality of event types, a set of device responses associated with the event, wherein each device response of the set of device responses is associated with a respective device function;
   determining respective device capabilities associated with each network-connected device of the plurality of network-connected devices;
   determining, based on (a) the respective device capabilities associated with each network-connected device of the plurality of network-connected devices and (b) the respective device functions associated with each device response of the set of device responses, a second subset of the plurality of network-connected devices capable of performing the set of device responses;
   searching, within the second subset of the plurality of network-connected devices, to identify one or more devices that enable at least one device response of the set of device responses to be perceptible to the user; and
   instructing the identified one or more devices to provide the at least one device response of the set of device responses associated with the event.

2. The method of claim 1, wherein the event type is at least one of an emergency, a cardiopulmonary resuscitation event, a Heimlich maneuver event, a cleaning event, a cooking event, a household event, a laundry event, a sports event, an exercise event, a cultural event, a holiday event, a celebration event, a walking event, a driving event, a repair event, a news event, or a child event.

3. The method of claim 2, wherein the set of device responses comprises generating for output audio and/or visual content related to the event determined to be related to the at least one of the emergency, the cardiopulmonary resuscitation event, the Heimlich maneuver event, the cleaning event, the cooking event, the household event, the laundry event, the sports event, the exercise event, the cultural event, the holiday event, the celebration event, the walking event, the driving event, the repair event, the news event, or the child event.

4. The method of claim 1, comprising determining a position of the user with relation to the identified one or more devices.

5. The method of claim 4, comprising determining based on the determined position whether the user is facing the identified one or more devices.

6. The method of claim 4, comprising determining based on the determined position whether the user is within a range of an audio output of the identified one or more devices.

7. The method of claim 4, comprising determining based on the determined position whether the identified one or more devices is able to detect the user.

8. The method of claim 1, comprising detecting an utterance of the user.

9. The method of claim 8, comprising determining a location of the user based on the detected utterance.

10. The method of claim 8, wherein the detecting the event in which the user is currently engaged is based on the detected utterance.

11. A system comprising:
    circuitry configured to:
    identify a plurality of network-connected devices;
    detect, by a first subset of the plurality of network-connected devices, an event in which a user is currently engaged, wherein the event is of an event type;
    retrieve, based on the event type and from a database of a plurality of device responses associated with a plurality of event types, a set of device responses associated with the event, wherein each device response of the set of device responses is associated with a respective device function;
    determine respective device capabilities associated with each network-connected device of the plurality of network-connected devices;
    determine, based on (a) the respective device capabilities associated with each network-connected device of the plurality of network-connected devices and (b) the respective device functions associated with each device response of the set of device responses, a second subset of the plurality of network-connected devices capable of performing the set of device responses;
    search, within the second subset of the plurality of network-connected devices, to identify one or more devices that enable at least one device response of the set of device responses to be perceptible to the user; and
    instruct the identified one or more devices to provide the at least one device response of the set of device capabilities responses associated with the event.

12. The system of claim 11, wherein the event type is at least one of an emergency, a cardiopulmonary resuscitation event, a Heimlich maneuver event, a cleaning event, a cooking event, a household event, a laundry event, a sports event, an exercise event, a cultural event, a holiday event, a celebration event, a walking event, a driving event, a repair event, a news event, or a child event.

13. The system of claim 12, wherein the set of device responses comprises generating for output audio and/or visual content related to the event determined to be related to the at least one of the emergency, the cardiopulmonary resuscitation event, the Heimlich maneuver event, the cleaning event, the cooking event, the household event, the laundry event, the sports event, the exercise event, the cultural event, the holiday event, the celebration event, the walking event, the driving event, the repair event, the news event, or the child event.

14. The system of claim 11, wherein the circuitry is configured to determine a position of the user with relation to the identified one or more devices.

15. The system of claim 14, wherein the circuitry is configured to determine based on the determined position whether the user is facing the identified one or more devices.

16. The system of claim 14, wherein the circuitry is configured to determine based on the determined position whether the user is within a range of an audio output of the identified one or more devices.

17. The system of claim 14, wherein the circuitry is configured to determine based on the determined position whether the identified one or more devices is able to detect the user.

18. The system of claim 11, wherein the circuitry is configured to detect an utterance of the user.

19. The system of claim 18, wherein the circuitry is configured to determine a location of the user based on the detected utterance.

20. The system of claim 18, wherein the detecting the event in which the user is currently engaged is based on the detected utterance.

* * * * *